United States Patent
Kannan et al.

(10) Patent No.: US 9,129,290 B2
(45) Date of Patent: Sep. 8, 2015

(54) APPARATUS AND METHOD FOR PREDICTING CUSTOMER BEHAVIOR

(75) Inventors: Pallipuram V. Kannan, Los Gatos, CA (US); Mohit Jain, Bangalore (IN); Ravi Vijayaraghavan, Mountain View, CA (US)

(73) Assignee: 24/7 Customer, Inc., Campbell, CA (US)

( * ) Notice: Subject to any disclaimer, the term of this patent is extended or adjusted under 35 U.S.C. 154(b) by 1456 days.

(21) Appl. No.: 12/392,058

(22) Filed: Feb. 24, 2009

(65) Prior Publication Data

US 2009/0222313 A1 Sep. 3, 2009

Related U.S. Application Data

(63) Continuation-in-part of application No. 11/360,145, filed on Feb. 22, 2006, now Pat. No. 7,761,321.

(60) Provisional application No. 61/031,314, filed on Feb. 25, 2008.

(51) Int. Cl.
*G06Q 10/00* (2012.01)
*G06Q 30/02* (2012.01)

(52) U.S. Cl.
CPC ............ *G06Q 30/02* (2013.01); *G06Q 30/0202* (2013.01)

(58) Field of Classification Search
CPC ..................... G06Q 10/0631; G06Q 10/06398; G06Q 10/0637; G06Q 10/067; G06Q 10/00; G06Q 10/06311; G06Q 10/06315; G06Q 10/06375; G06Q 10/0639; G06Q 10/06; G06Q 10/105; G06Q 10/06393; G06Q 10/103; G06Q 10/0635; G06Q 10/087

USPC ........... 705/7.11–7.42; 707/600–606; 703/22; 379/265.06

See application file for complete search history.

(56) References Cited

U.S. PATENT DOCUMENTS

| | | | | |
|---|---|---|---|---|
| 5,684,872 A | * | 11/1997 | Flockhart et al. | 379/266.08 |
| 6,014,647 A | * | 1/2000 | Nizzari et al. | 705/39 |
| 6,023,681 A | * | 2/2000 | Whitt | 705/7.29 |
| 6,151,571 A | * | 11/2000 | Pertrushin | 704/209 |
| 6,157,655 A | | 12/2000 | Shtivelman | |
| 6,212,502 B1 | * | 4/2001 | Ball et al. | 704/270 |

(Continued)

FOREIGN PATENT DOCUMENTS

| | | |
|---|---|---|
| EP | 0926614 | 6/1999 |
| EP | 1513088 | 3/2005 |

OTHER PUBLICATIONS

Van den Poel, Dirk, and Wouter Buckinx. "Predicting online-purchasing behaviour." European Journal of Operational Research 166.2 (2005): 557-575.*

(Continued)

*Primary Examiner* — Alan S Miller
(74) *Attorney, Agent, or Firm* — Michael A. Glenn; Perkins Coie LLP

(57) ABSTRACT

A predictive model generator that enhances customer experience, reduces the cost of servicing a customer, and prevents customer attrition by predicting the appropriate interaction channel through analysis of different types of data and filtering of irrelevant data. The model includes a customer interaction data engine for transforming data into a proper format for storage, data warehouse for receiving data from a variety of sources, and a predictive engine for analyzing the data and building models.

20 Claims, 19 Drawing Sheets

(56) References Cited

U.S. PATENT DOCUMENTS

| | | | |
|---|---|---|---|
| 6,330,326 B1* | 12/2001 | Whitt | 379/265.13 |
| 6,353,810 B1* | 3/2002 | Petrushin | 704/236 |
| 6,389,028 B1* | 5/2002 | Bondarenko et al. | 370/401 |
| 6,519,335 B1* | 2/2003 | Bushnell | 379/215.01 |
| 6,523,022 B1 | 2/2003 | Hobbs | |
| 6,542,602 B1* | 4/2003 | Elazar | 379/265.06 |
| 6,615,172 B1* | 9/2003 | Bennett et al. | 704/257 |
| 6,665,644 B1* | 12/2003 | Kanevsky et al. | 704/275 |
| 6,728,363 B2 | 4/2004 | Lieberman et al. | |
| 6,798,876 B1* | 9/2004 | Bala | 379/265.12 |
| 6,807,274 B2* | 10/2004 | Joseph et al. | 379/265.01 |
| 6,859,529 B2* | 2/2005 | Duncan et al. | 379/266.1 |
| 6,898,190 B2 | 5/2005 | Shtivelman et al. | |
| 6,938,000 B2* | 8/2005 | Joseph et al. | 705/304 |
| 6,956,941 B1* | 10/2005 | Duncan et al. | 379/265.01 |
| 7,027,586 B2* | 4/2006 | Bushey et al. | 379/265.09 |
| 7,103,553 B2* | 9/2006 | Applebaum et al. | 704/275 |
| 7,110,998 B1* | 9/2006 | Bhandari et al. | 1/1 |
| 7,120,700 B2 | 10/2006 | Macleod et al. | |
| 7,165,037 B2* | 1/2007 | Lazarus et al. | 705/7.31 |
| 7,181,444 B2 | 2/2007 | Porter et al. | |
| 7,194,483 B1* | 3/2007 | Mohan et al. | 707/600 |
| 7,215,759 B2 | 5/2007 | Brown et al. | |
| 7,269,516 B2* | 9/2007 | Brunner et al. | 702/19 |
| 7,353,035 B1 | 4/2008 | Kupsh et al. | |
| 7,398,224 B2* | 7/2008 | Cooper | 705/7.37 |
| 7,577,246 B2* | 8/2009 | Idan et al. | 379/265.01 |
| 7,599,861 B2* | 10/2009 | Peterson | 705/26.7 |
| 7,761,321 B2 | 7/2010 | Kannan et al. | |
| 7,778,863 B2* | 8/2010 | Yoshida et al. | 705/7.31 |
| 7,787,609 B1* | 8/2010 | Flockhart et al. | 379/265.01 |
| 7,792,278 B2 | 9/2010 | Watson et al. | |
| 7,848,909 B2* | 12/2010 | Kraiss | 703/6 |
| 7,953,219 B2* | 5/2011 | Freedman et al. | 379/265.06 |
| 7,996,251 B2 | 8/2011 | Kannan et al. | |
| 8,229,101 B1 | 7/2012 | Williams | |
| 2001/0016814 A1* | 8/2001 | Hauenstein | 704/231 |
| 2002/0047859 A1 | 4/2002 | Szlam et al. | |
| 2002/0083067 A1* | 6/2002 | Tamayo et al. | 707/100 |
| 2002/0087385 A1* | 7/2002 | Vincent | 705/10 |
| 2002/0114442 A1 | 8/2002 | Lieberman et al. | |
| 2002/0141561 A1* | 10/2002 | Duncan et al. | 379/220.01 |
| 2002/0156797 A1* | 10/2002 | Lee et al. | 707/200 |
| 2002/0196926 A1 | 12/2002 | Johnson et al. | |
| 2003/0028448 A1* | 2/2003 | Joseph et al. | 705/27 |
| 2003/0100998 A2* | 5/2003 | Brunner et al. | 702/19 |
| 2003/0123640 A1* | 7/2003 | Roelle et al. | 379/265.06 |
| 2003/0144895 A1* | 7/2003 | Aksu et al. | 705/9 |
| 2003/0174830 A1 | 9/2003 | Boyer et al. | |
| 2003/0200135 A1* | 10/2003 | Wright | 705/10 |
| 2004/0005047 A1* | 1/2004 | Joseph et al. | 379/265.01 |
| 2004/0098274 A1* | 5/2004 | Dezonno et al. | 705/1 |
| 2004/0117383 A1 | 6/2004 | Lee et al. | |
| 2004/0139426 A1* | 7/2004 | Wu | 717/120 |
| 2004/0141508 A1 | 7/2004 | Schoeneberger et al. | |
| 2004/0249650 A1* | 12/2004 | Freedman et al. | 705/1 |
| 2005/0004978 A1 | 1/2005 | Reed et al. | |
| 2005/0041796 A1* | 2/2005 | Joseph et al. | 379/266.03 |
| 2005/0091038 A1* | 4/2005 | Yi et al. | 704/10 |
| 2005/0097159 A1 | 5/2005 | Skidgel | |
| 2005/0102292 A1* | 5/2005 | Tamayo et al. | 707/10 |
| 2005/0147090 A1* | 7/2005 | MacLeod Beck et al. | 370/352 |
| 2005/0207559 A1 | 9/2005 | Shtivelman et al. | |
| 2005/0234697 A1* | 10/2005 | Pinto et al. | 703/22 |
| 2005/0246422 A1 | 11/2005 | Laning | |
| 2006/0031469 A1* | 2/2006 | Clarke et al. | 709/224 |
| 2006/0083362 A1 | 4/2006 | Anisimov et al. | |
| 2006/0143025 A1* | 6/2006 | Jeffery et al. | 705/1 |
| 2006/0277550 A1 | 12/2006 | Williams et al. | |
| 2007/0021966 A1 | 1/2007 | Ellefson et al. | |
| 2007/0043608 A1 | 2/2007 | May et al. | |
| 2007/0116239 A1 | 5/2007 | Jacobi et al. | |
| 2007/0198323 A1* | 8/2007 | Bourne et al. | 705/10 |
| 2007/0198359 A1 | 8/2007 | Kannan et al. | |
| 2007/0198368 A1 | 8/2007 | Kannan et al. | |
| 2007/0206584 A1* | 9/2007 | Fulling et al. | 370/356 |
| 2007/0214000 A1 | 9/2007 | Shahrabi et al. | |
| 2007/0244738 A1 | 10/2007 | Chowdhary et al. | |
| 2008/0167952 A1 | 7/2008 | Blair | |
| 2009/0097634 A1* | 4/2009 | Nambiar et al. | 379/265.09 |
| 2009/0132448 A1* | 5/2009 | Eder | 706/13 |
| 2009/0190746 A1* | 7/2009 | Chishti et al. | 379/265.12 |
| 2009/0190749 A1* | 7/2009 | Xie et al. | 379/266.01 |
| 2009/0222313 A1 | 9/2009 | Kannan et al. | |
| 2010/0262549 A1 | 10/2010 | Kannan et al. | |
| 2010/0332287 A1* | 12/2010 | Gates et al. | 705/10 |

OTHER PUBLICATIONS

Nath, Shyam V., and Ravi S. Behara. "Customer churn analysis in the wireless industry: A data mining approach." Proceedings-Annual Meeting of the Decision Sciences Institute. 2003.*

Grigori, Daniela, et al. "Improving business process quality through exception understanding, prediction, and prevention." (2001).*

Denton, H.; "Call Center Brings Quantifiable Advantages to Bottom Line"; Jul. 1998; Electric Light and Power, p. 17.

Jones, C.; "Entrepreneur Offers Chance to Jump the Queue"; Nov. 19, 2005; Times Higher Education Supplement, No. 1718, p. 8.

International Search Report and Written Opinion for related PCT application No. PCT/US09/61924 filed on Oct. 23, 2009, mailing date of ISR Jun. 8, 2010, 9 pages.

International Search Report and Written Opinion for related PCT application No. PCT/US07/03970 filed on Feb. 15, 2007; mailing date of ISR Oct. 1, 2007, 9 pages.

Gans, Noah et al.; *Telephone Call Centers: A Tutorial and Literature Review*, 2003; In Manufacturing and Service Operations Management 5, No. 2, http://www.columbia.edu/~ww2040/tutorial.pdf.

Gans, Noah et al.; *Telephone Call Centers: A Tutorial and Literature Review*; 2003; In Manufacturing and Service Operations Management 5, No. 2, http://www.columbia.edu/~ww2040/tutorial.pdf.

International Search Report and Written Opinion for parallel PCT application No. PCT/US2009/035071, date of mailing May 4, 2009.

Garver, Michael S., "Using Data Mining for Customer Satisfaction Research", Marketing Research, vol. 14, Issue 1; Chicago, Spring 2002, p. 8, 5 pgs.

Trembly, Ara C., "Mining Free-Form Data Enables Better Customer Service", National Underwriter (Life, health/financial services ed.), vol. 107, Issue 43, Oct. 27, 2003, p. 42.

* cited by examiner

APPARATUS AND METHOD FOR PREDICTING CUSTOMER BEHAVIOR

CROSS REFERENCE TO RELATED APPLICATIONS

This patent application is a continuation-in-part of U.S. patent application Ser. No. 11/360,145, System and Method for Customer Requests and Contact Management, filed Feb. 22, 2006 now U.S. Pat. No. 7,761,321, and claims the benefit of U.S. provisional patent application Ser. No. 61/031,314, Service Cube, filed Feb. 25, 2008, the entirety of each of which are incorporated herein by this reference thereto.

BACKGROUND OF THE INVENTION

1. Technical Field

This invention relates generally to the field of service modules. More specifically, this invention relates to a data and prediction driven methodology for facilitating customer interaction.

2. Description of the Related Art

When a customer desires to purchase a good or service, there are a variety of interaction channels for receiving the customer's order that are along a spectrum of human-guided interactions. On one end of the spectrum, a customer can order goods or services from a human over the telephone. The other end of the spectrum includes completely automated services such as a website for receiving customer orders. Along this spectrum are mixed human and automatic interactions. For example, a customer can place an order on a website while chatting with a human over the Internet. In addition, the user can email a human with order information and the human inputs the order into an automated system.

The type of interaction is a function of customer preference, the cost of servicing the customer, and the lifetime value of the customer to the company. For example, the cost of providing a human to receive orders is more expensive than self-service over a website, but if the customer would not otherwise purchase the good or service, the company still profits.

The cost of interacting with customers could be reduced if there were a way to categorize and thus predict customer behavior. For example, the process would be more efficient if there were a way to predict that a particular customer is difficult and, as a result, assign the customer to an agent with experience at diffusing an irate customer, which would result in a happier customer and a shorter interaction time.

SUMMARY OF THE INVENTION

In one embodiment, the invention comprises a method and/or an apparatus that enhances customer experience, reduces the cost of servicing a customer, predicts and prevents customer attrition by predicting the appropriate interaction channel through analysis of different types of data and filtering of irrelevant data, and predicts and enhances customer growth.

Customer experience is enhanced by empowering the customer to choose an appropriate interaction channel, exploiting the availability of web-based self-service wizards and online applications; reducing the resolution time by preserving the service context as a customer moves from one channel to another; and using auto-alerts, reminders, and auto-escalations through the web-based service portal. The cost of servicing a customer is reduced by deflecting service requests from a more expensive to a less expensive channel, increasing the first time resolution percentage, and reducing the average handle time. The customer attrition is predicted and prevented by offering the most appropriate interaction channel, ensuring that the service request is handled by the right agent. Customer growth is achieved by targeting the right offer to the right customer at the right time through the right channel.

DETAILED DESCRIPTION OF THE INVENTION

In one embodiment, the invention comprises a method and/or an apparatus for generating models to predict customer behavior.

Figure 1:
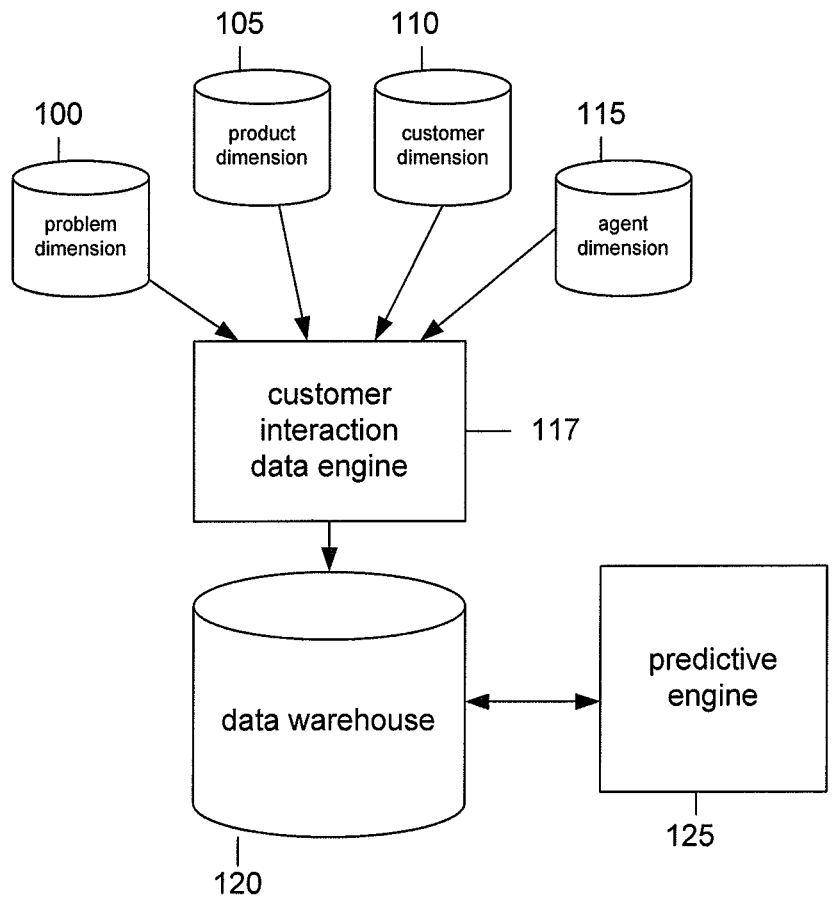
FIG. 1 is a block diagram that illustrates an apparatus for receiving information and making decisions according to one embodiment of the invention.

FIG. 1 is an illustration of the system for analyzing data and generating predictive models according to one embodiment of the invention. In one embodiment, a customer interaction data engine 117 receives data from a problem dimension 100, a product dimension 105, a customer dimension 110, and an agent dimension 115. The customer interaction data engine 117 transmits the data to a data warehouse 120 for storage. The data warehouse 120 transmits requested data to a predictive engine 125, which organizes the data, filters out the irrelevant data, and builds models for predicting user needs.

Data Sources

The predictive engine 125 requires information to generate accurate predictions. In one embodiment, the information is limited to customer interactions derived from one company's sales. If the information is derived from a large company, e.g. Amazon.com®, the data set is large enough to make accurate predictions. Smaller companies, however, lack sufficient customer data to make accurate predictions.

In one embodiment, a customer interaction data engine 117 receives data categorized as a problem dimension 100, a product dimension 105, a customer dimension 110, and an agent dimension 115. This data comes from a variety of sources such as customer history, call by call transactions, etc.

The problem dimension 100 contains data relating to any customer interaction arising from a problem with a product or service. In one embodiment, the problem dimension 100 comprises a unique identification number associated with a particular problem, a description of the problem, a category, a sub-category, and any impact on customers.

The product dimension 105 contains information about a particular product. In one embodiment, the product dimension 105 comprises a unique identification number associated with each product, a product, a category, a sub-category, information regarding the launch of the product, and notes. In another embodiment, the product identification is a unique identification number associated with each purchase of a product.

The customer dimension 110 contains information about the customer. In one embodiment, the customer dimension 110 comprises a unique identification number associated with the customer; a company name; a location that includes an address, zip code, and country; a phone number; a role contact; an account start date; a first shipment date, a last shipment date; the number of goods or services purchased in the last month; the number of goods or services purchased in the last year; a statistics code; credit limits; and the type of industry associated with the customer. The time from purchase is divided into stages. For example, the first stage is the first three months after purchase of the product, the second stage is three to six months from purchase, etc.

In one embodiment, the customer dimension 110 contains both structured and unstructured data. Unstructured data can be free text or voice data. The free text is from chat, emails, blogs, etc. The voice data is translated into text using a voice-to-text transcriber. The customer interaction data engine 117 structures the data and merges it with the other data stored in the data warehouse 120.

The agent dimension 115 includes information about the people who receive phone calls from customers. The agent dimension 115 also contains both structured and unstructured data. The data is used to match customers with agents. For example, if a model predicts that a particular customer does not require a large amount of time, the call can be matched with a less experienced agent. On the other hand, if a model predicts that the customer requires a large amount of time or has a specialized problem, it is more efficient to match the customer with an experienced agent, especially if the agent has specialized knowledge with regard to a product purchased by the customer, angry customers from the south, etc.

In one embodiment, the agent dimension 115 includes a unique identification number associated with the agent, the agent's name, a list of the agent's skill sets, relevant experience in the company in general, relevant experience in particular areas in the company, interactions per day, customer satisfaction scores, gender, average handle times (AHT), holding time, average speed of answer (ASA), after call work (ACW) time, talk time, call outcome, call satisfaction (CSAT) score, net experience score (NES), and experience in the process. An AHT is the time from the moment a customer calls to the end of the interaction, i.e. talk and hold time. The ASA measures the time the agent spends speaking to the customer. The ACW is the time it takes the agent to complete tasks after the customer call, e.g. reordering a product for a customer, entering comments about the call into a database, etc.

CSAT is measured from survey data received from customers after a transaction is complete. The NES tracks agent cognitive capabilities, agent emotions, and customer emotions during the call by detecting keywords that are characterized as either positive or negative. In one embodiment, the NES algorithm incorporates rules about the proximity of phrases to agents, products, the company, etc. to further characterize the nature of the conversations.

The positive characteristics for cognitive capabilities include building trust, reviewability, factuality, attentiveness, responsiveness, greetings, and rapport building. The negative characteristics for cognitive capabilities include ambiguity, repetitions, and contradictions. Positive emotions include keywords that indicate that the parties are happy, eager, and interested. Negative emotions include keywords that indicate that the parties are angry, disappointed, unhappy, doubtful, and hurt.

In one embodiment, the customer interaction engine 117 calculates a positive tone score, a negative tone score, takes the difference between scores, and divides by the sum of the negative tone score and positive tone score. This equation is embodied in equation 1:

$$\Sigma(P_1+P_2+\ldots P_x)-\Sigma(N_1+N_2+\ldots N_y)/\Sigma(P_1+P_2+\ldots P_x)+\Sigma(N_1+N_2+\ldots N_y) \quad \text{(eq 1)}$$

In another embodiment, the customer interaction engine 117 uses a weighted approach that gives more weight to extreme emotions. If the conversation takes place in written form, e.g. instant messaging, the algorithm gives more weights to bolded or italicized words. Furthermore, the algorithm assigns a score to other indicators such as emoticons.

Figure 2:
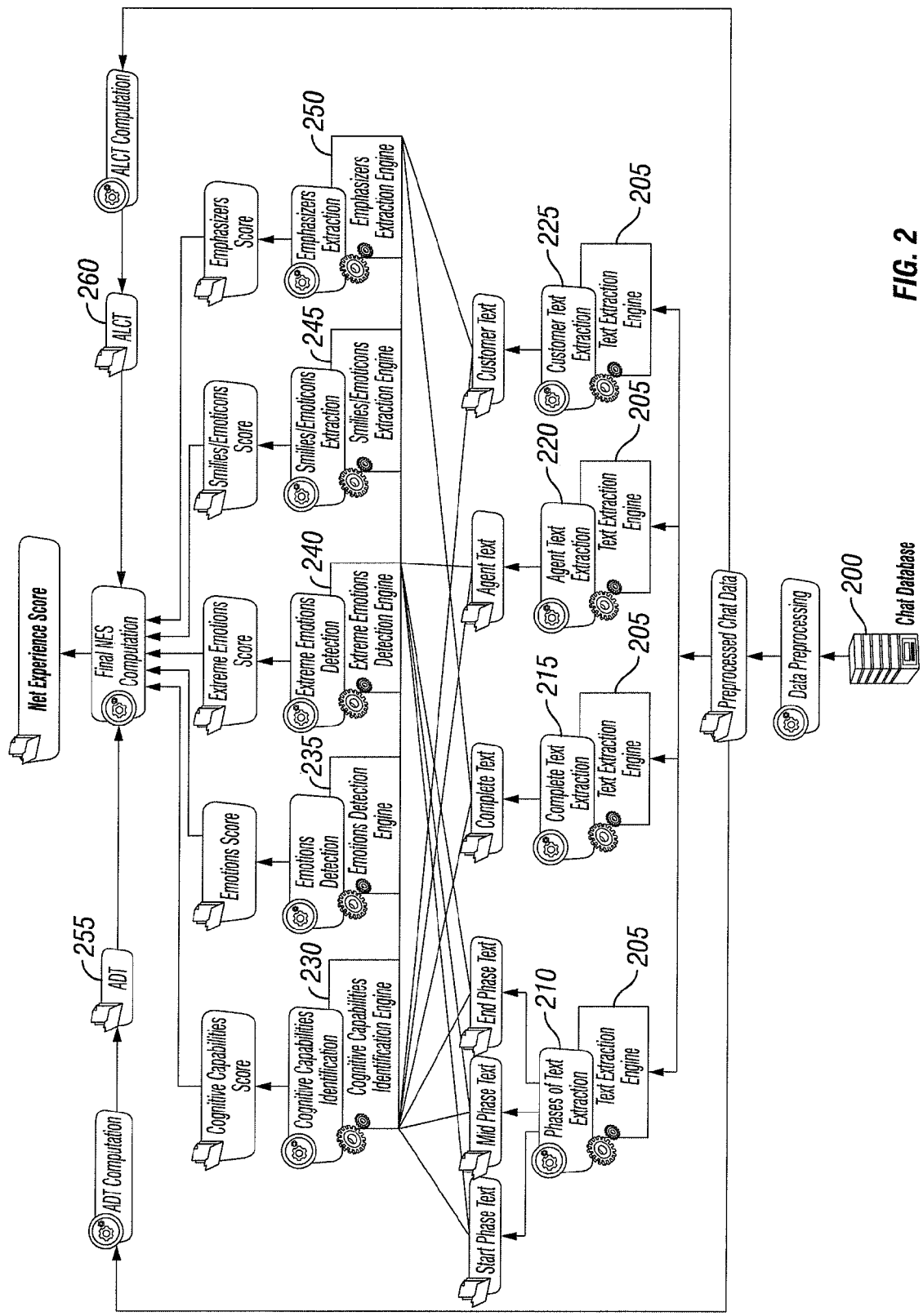
FIG. 2 is an illustration of calculating the NES when the communication occurs over instant messaging according to one embodiment of the invention.

FIG. 2 is an illustration of calculating the NES when the communication occurs over instant messaging according to one embodiment of the invention. A chat database 200 stores all chat data. The chat data is analyzed by a text extraction engine 205, which breaks the chat data into phases 210, extracts the complete text 215, extracts the agent text 220 separately, and extracts the customer text 225 separately. All extracted text is analyzed and assigned a score by the cognitive capabilities engine 230, the emotions detection engine 235, the extreme emotions detection engine 240, the smilies/emoticon engine 245, and the emphasizers extraction engine 250. The NES is a function of the scores generated by the engine 230-250, the average delay time (ADT) 255 during the chat, and the average length of customer text (ALCT) 260.

Customer Interaction Data Engine

In one embodiment, the data from each of the dimensions is transferred to the customer interaction data engine 117 for data processing. The data received from the different dimensions is frequently received in different formats, e.g. comma separated values (csv), tab delimited text files, etc. The data warehouse 120, however, stores data in columns. Thus, the customer interaction data engine 117 transforms the data into a proper format for storage in the data warehouse 120. This transformation also includes taking unstructured data, such as the text of a chat, and structuring it into the proper format. In one embodiment, the customer interaction data engine 117 receives data from the different dimensions via a file transfer protocol (FTP) from the websites of companies that provide goods and services.

In one embodiment, the data warehouse 120 is frequently updated with data. As a result, the data is increasingly accurate. This is particularly important when a model is generated for a customer using that customer's previous interactions with a company because those interactions are a strong predictor of future behavior.

Predictive Engine

The predictive engine 125 compiles the data from the data warehouse 120 and organizes the data into clusters known as contributing variables. Contributing variables are variables that have a statistically significant effect on the data. For example, the shipment date of a product affects the date that the customer reports a problem. Problems tend to arise after certain periods such as immediately after the customer receives the product or a year after use. Thus, shipment date is a contributing variable. Conversely, product identification is not a contributing variable because it cannot be correlated with any other factor.

Contributing variables are calculated according to whether the variable is numerical or a categorical prediction. Contributing variables for numbers are calculated using regression analysis algorithms, e.g. least squares, linear regression, a linear probability model, nonlinear regression, Bayesian linear regression, nonparametric regression, etc. Categorical predictions use different methods, for example, a neural network or a Naïve Bayes algorithm.

Figure 3:
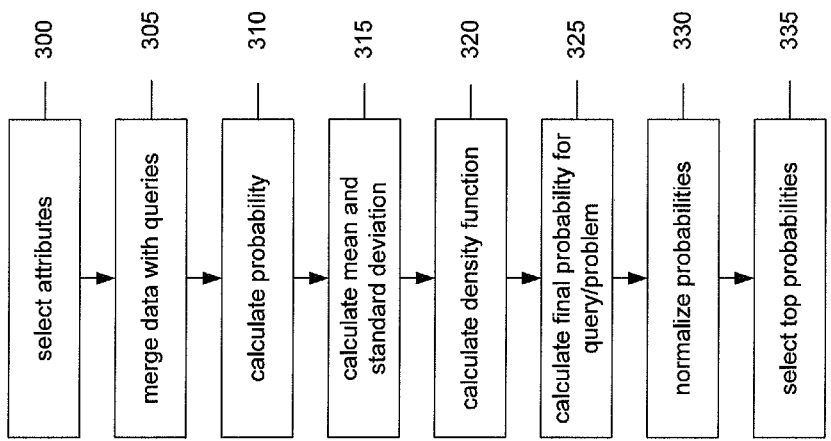
FIG. 3 is a flow chart that illustrates the steps for predicting behavior according to one embodiment of the invention.

The contributing variables are used to generate models that predict trends, patterns, and exceptions in data through statistical analysis. In one embodiment, the predictive engine 130 uses a naïve Bayes algorithm to predict behavior. The following example is used to show how a naïve Bayes algorithm is used by the predictive engine 130 to predict the most common problems associated with a family in Arizona using mobile devices made by Nokia. FIG. 3 is a flow chart that illustrates the steps performed by the predictive engine 130 to generate a model that predicts behavior/problems according to one embodiment of the invention.

The problem to be solved by the predictive engine 130 is given a set of customer attributes, what are the top queries the customer is likely to have. Attributes are selected 300 for the model and for different levels of the attribute. Table 1 illustrates the different attributes: state, plan, handset, BznsAge, and days left on the plan. BznsAge is an abbreviation of business age, i.e. how long someone has been a customer. The attribute levels further categorize the different attributes.

TABLE 1

| Attributes | Attribute Levels | | | |
|---|---|---|---|---|
| State | Arizona | Alabama | Wisconsin | Ohio |
| Plan | Family | Basic | Friends | |
| Handset | Nokia | Motorola | RIM | |
| BznsAge | | Continuous Numeric Values | | |
| Days_Left | | Continuous Numeric Values | | |

Data from the problem dimension 100, product dimension 105, and agent dimension 110 are merged 305 with queries from text mining. These text mining queries are examples of unstructured data that was structured by the customer interaction data engine 117. Table 2 shows the merged data for the customer attributes. Table 3 shows the merged data for the queries from text mining, which include all the problems associated with the mobile phones.

TABLE 2

| | Customer's Attributes | | | | |
|---|---|---|---|---|---|
| ID | State | Plan | Handset | BznsAge | Days_Left |
| 1 | Arizona | Friends | Nokia | 245 | 123 |
| 2 | Alabama | Basic | Nokia | 324 | 234 |
| 3 | Alabama | Basic | Motorola | 254 | 245 |
| 4 | Wisconsin | Friends | RIM | 375 | 311 |
| 5 | Arizona | Family | Nokia | 134 | 153 |
| 6 | Alabama | Basic | Motorola | 234 | 134 |
| 7 | Ohio | Friends | Nokia | 296 | 217 |
| 8 | Ohio | Friends | Motorola | 311 | 301 |
| 9 | Ohio | Basic | RIM | 186 | 212 |
| 10 | Arizona | Family | Nokia | 276 | 129 |
| 11 | Wisconsin | Friends | Motorola | 309 | 187 |
| 12 | Arizona | Basic | Motorola | 244 | 156 |
| 13 | Alabama | Family | RIM | 111 | 256 |
| 14 | Arizona | Friends | RIM | 222 | 385 |
| 15 | Ohio | Family | Nokia | 268 | 134 |

TABLE 3

| | Queries from Text Mining | | | | | | | | |
|---|---|---|---|---|---|---|---|---|---|
| ID | Signal | Battery | Screen | Access | CallDrop | Warranty | Accessories | Activation | Cancel |
| 1 | 0 | 1 | 1 | 1 | 0 | 1 | 0 | 1 | 0 |
| 2 | 0 | 1 | 0 | 1 | 1 | 0 | 0 | 1 | 1 |
| 3 | 0 | 1 | 0 | 0 | 1 | 1 | 0 | 1 | 1 |
| 4 | 1 | 1 | 0 | 1 | 0 | 1 | 1 | 0 | 1 |
| 5 | 0 | 0 | 0 | 1 | 1 | 1 | 1 | 0 | 1 |
| 6 | 1 | 1 | 0 | 1 | 1 | 1 | 0 | 1 | 1 |
| 7 | 1 | 1 | 1 | 0 | 1 | 0 | 1 | 1 | 0 |
| 8 | 1 | 1 | 1 | 0 | 1 | 0 | 1 | 1 | 1 |
| 9 | 1 | 1 | 0 | 1 | 1 | 0 | 0 | 0 | 0 |
| 10 | 1 | 0 | 1 | 1 | 0 | 1 | 0 | 1 | 1 |
| 11 | 1 | 0 | 1 | 1 | 1 | 1 | 0 | 0 | 0 |
| 12 | 0 | 0 | 0 | 0 | 0 | 1 | 1 | 0 | 1 |
| 13 | 0 | 1 | 0 | 1 | 1 | 1 | 1 | 0 | 1 |

TABLE 3-continued

Queries from Text Mining

| | Signal | Battery | Screen | Access | CallDrop | Warranty | Accessories | Activation | Cancel |
|---|---|---|---|---|---|---|---|---|---|
| 13 | 0 | 1 | 0 | 0 | 0 | 1 | 0 | 1 | 1 |
| 14 | 0 | 0 | 0 | 1 | 0 | 0 | 1 | 1 | 0 |
| 15 | 7 | 10 | 5 | 10 | 9 | 10 | 7 | 9 | 10 |
| Grand Total | | | | | 77 | | | | |

Where a 1 represents a problem and a 0 represents no problem.

The conditional probability of Query Q to be asked by the customer if he possesses the attributes $A_1, \ldots, A_n$ is determined by calculating 310 the probability p(Q) and calculate 315 the conditional probabilities $p(A_i/Q)$ using the naïve Bayes algorithm:

$$p(Q/A_1, \ldots, A_n) = p(Q)p(A_1/Q)p(A_2/Q) \ldots p(A_n/Q) \quad \text{Eq. (3)}$$

p(Q) is calculated as the ration of number times query Q that appears in the matrix to the summation of number of times all the queries $Q_1, \ldots Q_n$ occur. $p(A_i/Q)$ is calculated differently for categorical and continuous data. The probabilities for all Queries based on the attributes are calculated and the top three problems are selected based on the value of probability.

For example, if a customer comes with the attributes (Arizona, Family, Nokia, 230, 120), the probability of Signal query can be calculated as follows:

p(Signal/Arizona,Family,Nokia,230,120)=p(Signal)p(Arizona/Signal)p(Family/Signal)p(BznsAge=230/Signal)p(DaysLeft=120/Signal)

p $(A_i/Q)$ can be calculated as the ratio of the number of times attribute $A_i$ appeared in all the cases when Query Q appeared to the number of times Query Q appeared.

The probabilities for Signal Query are:

p (Signal)=7/77 Signal query appears seven times while there are a total of 77 Queries (Tables 2 and 3). p (Arizona/Signal)=1/7 Arizona appears only once when Signal query occurs. p (Family/Signal)=1/7 Family appears only once when Signal query occurs. p (Nokia/Signal)=2/7 Nokia appears only once when Signal query occurs.

The Cancel Query is calculated the same way:

p(Cancel)=10/77. p(Arizona/Cancel)=4/10. p(Family/Cancel)=3/10. p(Nokia/Cancel)=3/10.

These conditional probabilities can be populated in a matrix, to be used in a final probability calculation. The cells with an * do not have a calculated probability, however, in an actual calculation these cells would have to be populated as well. Table 4 is a matrix populated with the conditional probabilities.

TABLE 4

| | Signal | Battery | Screen | Access | CallDrop | Warranty | Accessories | Activation | Cancel |
|---|---|---|---|---|---|---|---|---|---|
| p(Query) | 7/77 | * | * | * | * | * | * | * | 10/77 |
| p(Attribute/Query) | | | | | | | | | |
| Arizona | 1/7 | * | * | * | * | * | * | * | 4/10 |
| Alabama | * | * | * | * | * | * | * | * | * |
| Wisconsin | * | * | * | * | * | * | * | * | * |
| Ohio | * | * | * | * | * | * | * | * | * |
| Family | 1/7 | * | * | * | * | * | * | * | 3/10 |
| Basic | * | * | * | * | * | * | * | * | * |
| Friends | * | * | * | * | * | * | * | * | * |
| Nokia | 2/7 | * | * | * | * | * | * | * | 3/10 |
| Motorola | * | * | * | * | * | * | * | * | * |
| RIM | * | * | * | * | * | * | * | * | * |

Assuming the data to be normally distributed, the probability density function is:

$$f(x) = (1/2\pi\sqrt{\sigma})e^{-[(x-\mu)^2/2\sigma^2]} \quad \text{Eq. (4)}$$

Probability at a single point in any continuous distribution is zero. Probability for a small range of a continuous function is calculated as follows:

$$P(x-\Delta x/2 < X < x+\Delta x/2) = \Delta x f(x) \quad \text{Eq. (5)}$$

Treating this as the probability for a particular value, we can neglect $\Delta x$ because this term appears in all the probabilities calculated for each Query/Problem. Hence the density function f(x) is used as the probability, which is calculated 325 for a particular numeric value X from its formula. The mean ($\mu$) and standard deviation ($\sigma$) for the assumed normal distribution can be calculated 320 as per the following formulas:

$$\mu = 1/n(\Sigma_{i=1}^n X_i) \quad \text{Eq. (6)}$$

$$\sigma = \sqrt{[1/n-1(\Sigma_{i=1}^n (X_i-\mu)^2]} \quad \text{Eq. (7)}$$

For signal problem, the mean and standard deviation for BznsAge are calculated using equations 6 and 7:

$\mu_{BznsAge}$=(375+234+296+311+186+276+309)/7=283.85

$\sigma_{BznsAge}$=1/6[(375−283.85)2+(234−283.85)2+(296−283.85)2+(311−283.85)2+(186−283.85)2+(276−283.85)2+(309−283.85)2=60.47

$p(BznsAge=230/Signal)=[1/(2\pi\sqrt{60.47})]e^{\wedge}(230-283.85)^2/60.47^2=0.029169$ Similarly for Days_Left: $\mu_{DaysLeft}=213$, $\sigma_{DaysLeft}=72.27$, p(DaysLeft=120/Signal)=0.04289

For Cancel, the mean and standard deviation are for BznsAge and Days_Left are calculated in similar fashion: $\mu_{BznsAge}=248.5$, $\sigma_{BznsAge}=81.2$, p(BznsAge=230/Cancel)=0.018136, $\mu_{DaysLeft}=230.4$, $\sigma_{DaysLeft}=86.51$, p(DaysLeft=120/Cancel)=0.03867.

These probabilities are calculated in real time, with the exact value of the attribute possessed by the customer. Table 5 is a matrix populated with the mean and standard deviations, which are further used for the probability calculation in real time.

TABLE 5

|  |  | Signal | Cancel |
|---|---|---|---|
| BznsAge | Mean (μ) | 283.85 | 248.5 |
|  | S.D (σ) | 60.47 | 81.2 |
| Days_Left | Mean (μ) | 213 | 230.4 |
|  | S.D (σ) | 72.27 | 86.51 |

The final probability for a query/problem for the given set of attributes is calculated 330:

$p$(Signal/Arizona,Family,Nokia,230,120)=7/77*1/7*1/7*2/7*0.029169*0.04289=0.0000006632

$p$(Cancel/Arizona,Family,Nokia,230,120)=10/77*4/10*3/10*3/10*0.018136*0.03867=0.0000032789

The probabilities are normalized 335 and the top three probabilities and corresponding queries/problems are selected 340.

Normalization:

$p$(Signal/Arizona,Family,Nokia,230,120)=
(0.0000006632/0.0000006632+0.0000032789)*100=83.17%

$p$(Cancel/Arizona,Family,Nokia,230,120)=
(0.0000032789/0.0000032789+0.0000006632)*100=16.83%

Thus, in this example, the signal problem has a significantly higher probability of occurring as compared to the cancel problem.

If any conditional probability for an attribute is zero, the zero cannot be used in calculations because any product using zero is also zero. In this situation, the Laplace estimator is used:

$$p(A_i/Q)=(x+1/y+n) \qquad \text{Eq. (8)}$$

Where 1/n is the prior probability of any query/problem. If the x and y were not present in the equation, the probability would be 1/n. In this equation, even if x is 0, the conditional probability is nonzero.

Models

This requires sorting the data in order of magnitude, moving between high-level organization, e.g. general trends to low-level views of data, i.e. the details. In addition, it is possible to drill up and down through levels in hierarchically structured data and change the view of the data, e.g. switch the view from a bar graph to a pie graph, view the graph from a different perspective, etc.

In one embodiment, the models represent data with text tables, aligned bars, stacked bars, discrete lines, scatter plots, Gantt charts, heat maps, side-by-side bars, measure bars, circles, scatter matrices, histograms, etc.

The predictive engine 125 predicts information such as the probability of a customer to face a particular problem based on the customer's engagement stage with a particular problem. An engagement stage is product specific. In one embodiment, the engagement stage is measured by time, e.g. the first stage is 0-15 days after purchase, the second stage is 15 days-two months after purchase, etc. In addition, the model predicts a customer's preference of a particular channel based on the type of concern and its impact on customer experience. Lastly, the models predict the probable impact of a particular problem on the customer's loyalty, growth, and profitability score.

Once the model is generated, a business can use the system to predict how to best serve their clients, e.g. whether to staff more customer service representatives or invest in developing a sophisticated user interface for receiving orders. In another embodiment, the model is used in real-time to predict customer behavior. For example, a customer calls a company and based on the customer's telephone number, the customer ID is retrieved and the company predicts a user interaction mode. If the user interaction mode is a telephone conversation with an agent, the model assigns an agent to the customer.

In another example, the model is incorporated into a website. A customer visits the website and requests interaction. The website prompts the user for information, for example, the user name and product. The model associates the customer with that customer's personal data or the model associates the customer with a cluster of other customers with similar shopping patterns, regional location, etc. The model predicts a user interaction mode based on the answers. For example, if the system predicts that the customer is best served by communicating over the phone with an agent, the program provides the user with a phone number of an agent.

Services

In one embodiment, the services are categorized as booking, providing a quote, tracking a package, inquiries on supplies, and general inquiries. The model prediction is applied to customer categories according to these services. For example, a model predicts a customer's preference for a particular channel when the customer wants a quote for a particular good or service.

Generating Models

Figure 4:
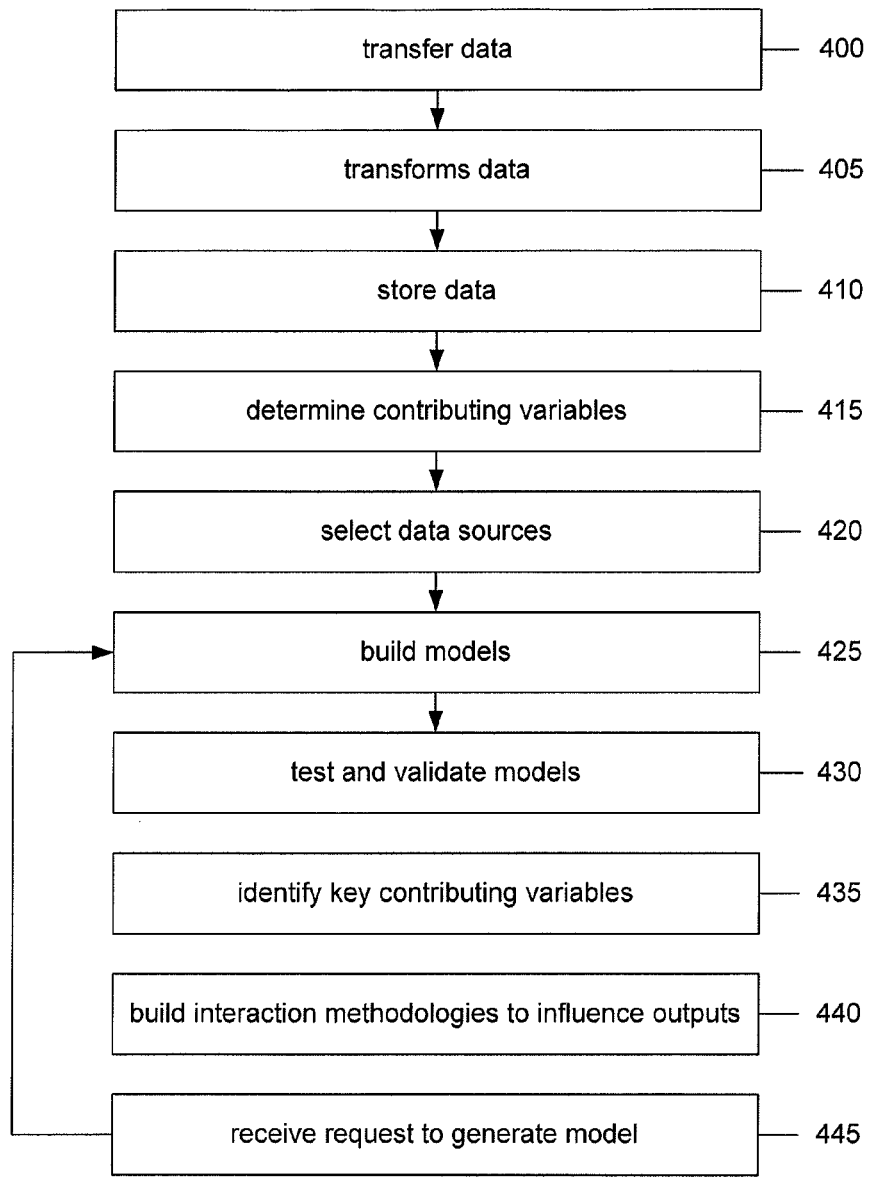
FIG. 4 is a flow chart that illustrates the steps for generating a model that predicts behavior according to one embodiment of the invention

FIG. 4 is a flow chart illustrating the steps for generating a model according to one embodiment of the invention. The first stage involves steps performed offline. The data is transferred 400 from the problem dimension 100, the product dimension 105, the customer dimension 110, and the agent dimension 115 to the customer interaction data engine 117. The customer interaction data engine 117 transforms 405 the data into a proper format for storage. As described in the section on the customer interaction data engine 117, transforming the data includes both converting data from one format to another and extracting keywords from text files. The data is stored 410 in the data warehouse 120. The predictive engine 125 determines 415 contributing variables by calculating probabilities. As described in the example, one method of determining contributing variables is by using the naïve Bayes algorithm. A person of ordinary skill in the art will recognize how to determine contributing variables using other statistical algorithms.

The predictive engine 125 is now ready to build models. In one embodiment, the user selects 420 data sources, which are used to build 425 models. By experimenting with different variables in the models, the predictive engine 125 tests and validates 430 different models. Based on these models, the predictive engine 125 identifies key contributing variables 435 and builds interaction methodologies to influence the outputs 440. As more data is received by the data warehouse 120, these steps are repeated to further refine the model.

In one embodiment, the predictive engine 125 receives 445 a request in real time to generate a predictive model. The predictive engine 125 builds 425 a model using the data received by the user. For example, the predictive engine 125 may receive an identifying characteristic of a customer, e.g. unique ID, telephone number, name, etc. and be asked to predict the best mode of communicating with this customer, the most likely reason that the customer is calling, etc.

Figure 5:
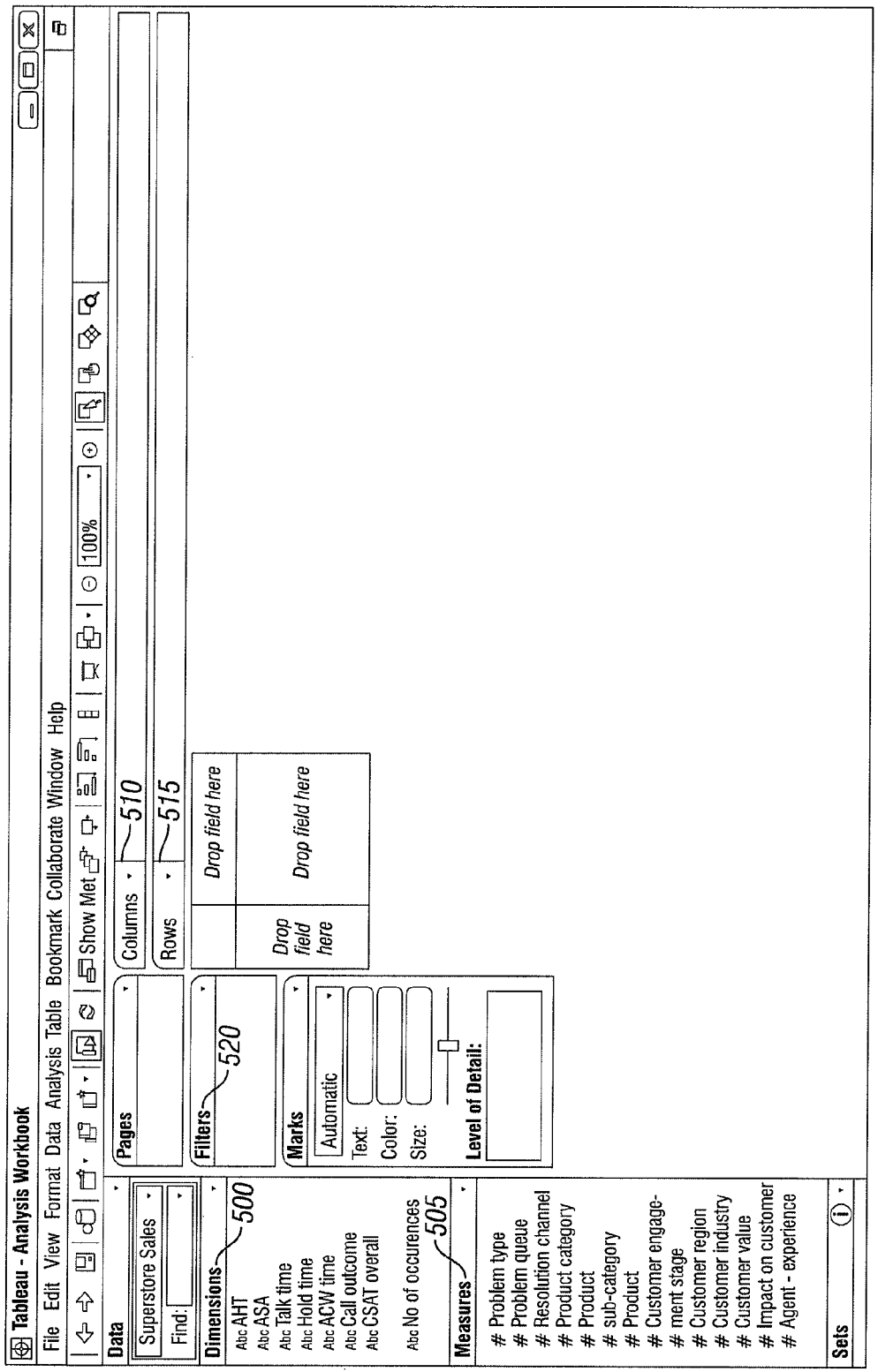
FIG. 5 is a user interface for generating a model according to one embodiment of the invention.

In another embodiment, the predictive engine receives a request for a model depicting various attributes as selected by the user from a user interface such as the one illustrated in FIG. 5 according to one embodiment of the invention. The data sources are divided according to dimensions 500 and measures 505. Dimension 500 refers to attributes of an entity for analysis, for example, customer interaction as a product of geography. Measures 505 refer to variables that can be measured. For example, number of products purchased, number of issues associated with a product, etc. In FIG. 5, the available dimensions 500 are AHT, ASA, talk time, hold time, ACW time, call outcome, CSAT overall, and number of occurrences. The available measures 505 are problem type, problem queue, resolution channel, product category, product sub-category, product, customer engagement stage, customer region, customer industry, customer value, impact on customer, and agent-experience. The user specifies which variable is displayed in columns 510 and rows 515. In one embodiment, the user specifies a filter 520 to filter certain variables from being considered by the model.

Figure 6:
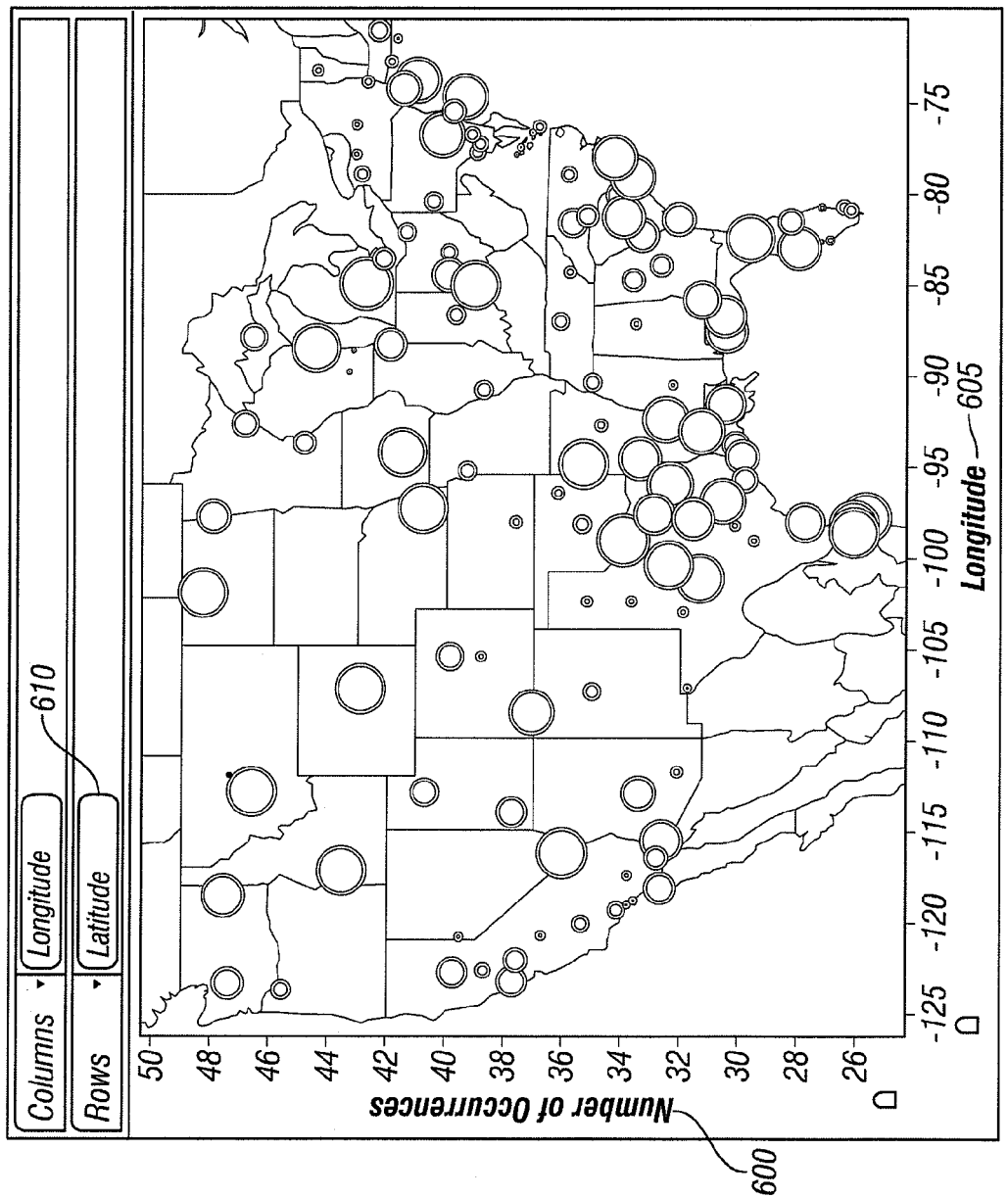
FIG. 6 is a model of a number of occurrences of delivery packages as a function of location in the United States according to one embodiment of the invention.

FIG. 6 depicts a model that focuses on geographic variables according to one embodiment of the invention. The model is a heat map of occurrences 600 of places where packages were delivered, which is expressed as longitude 605 on the x-axis and latitude 610 on the y-axis. In this example, the service provider is a delivery company that delivers packages all across the United States. It is apparent from the map that Texas is a very popular place for delivering packages. Thus, the service provide might conclude from this map that they should divert any extra resources, e.g. follow up calls, personalized service to Texas. Alternatively, the service provider might conclude that because they don't provide any service to South Dakota, there are many potential customers in South Dakota and the state should be targeted with advertising.

Figure 7:
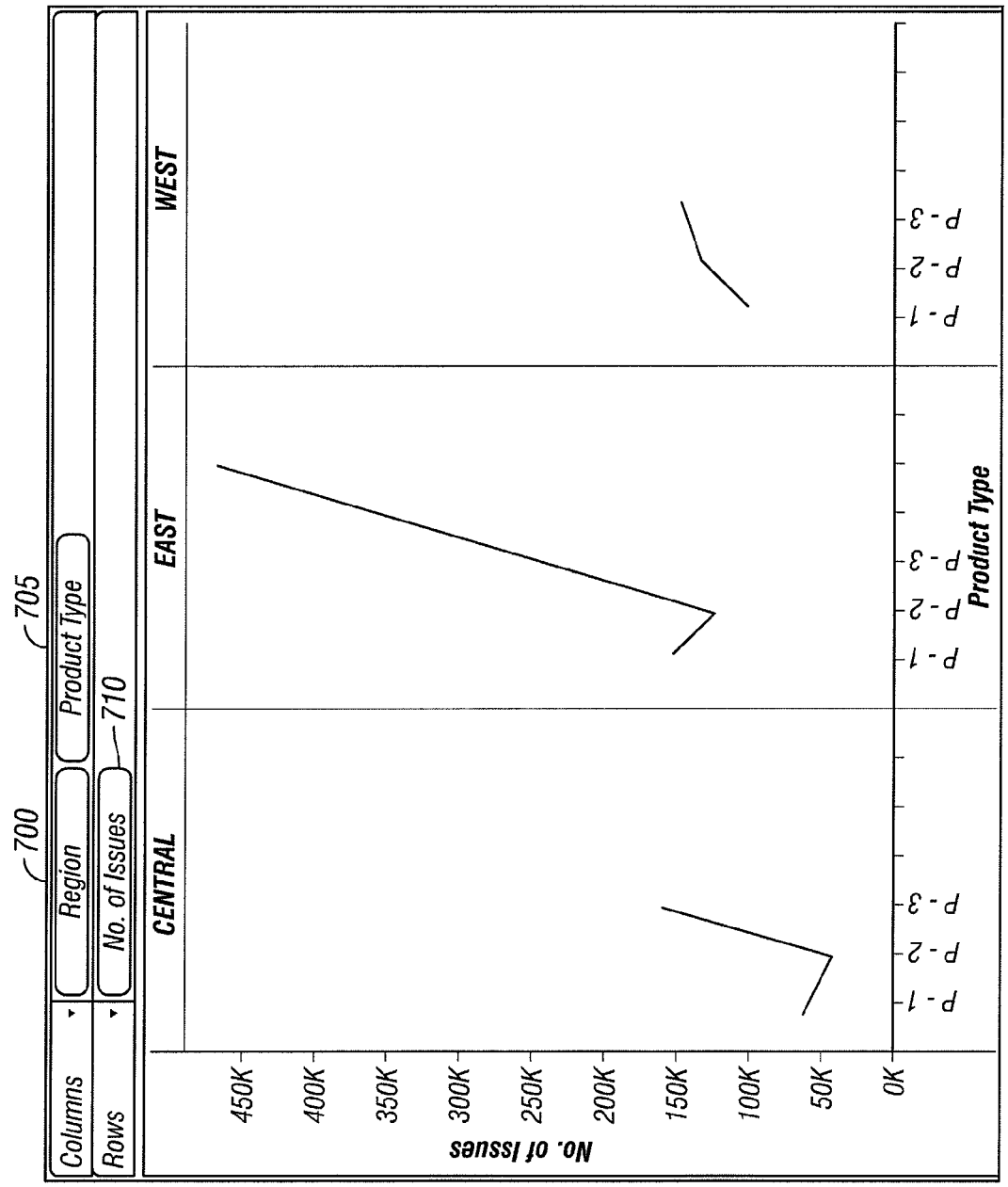
FIG. 7 is a model of a number of issues of three different products in three different parts of the United States according to one embodiment of the invention.

In one embodiment, the model generator 130 generates a model with multiple variables. FIG. 7 is an example of a model that uses two different variables for the rows: region 700 and product type 705 and one variable for the column: number of issues 710. Several conclusions can be drawn from this model. First, people in the East have more issues with products than the rest of the country. Second, the third product generates a significant number of problems compared to the first and second products. Although it is not clear from this model how many of these products were shipped out, unless that number is in the millions, having 450,000 issues with the product in the East alone, FIG. 7 demonstrates that the product is deficient and that there is an added cost associated with sending products to people in the East because they complain about the products.

Figure 8:
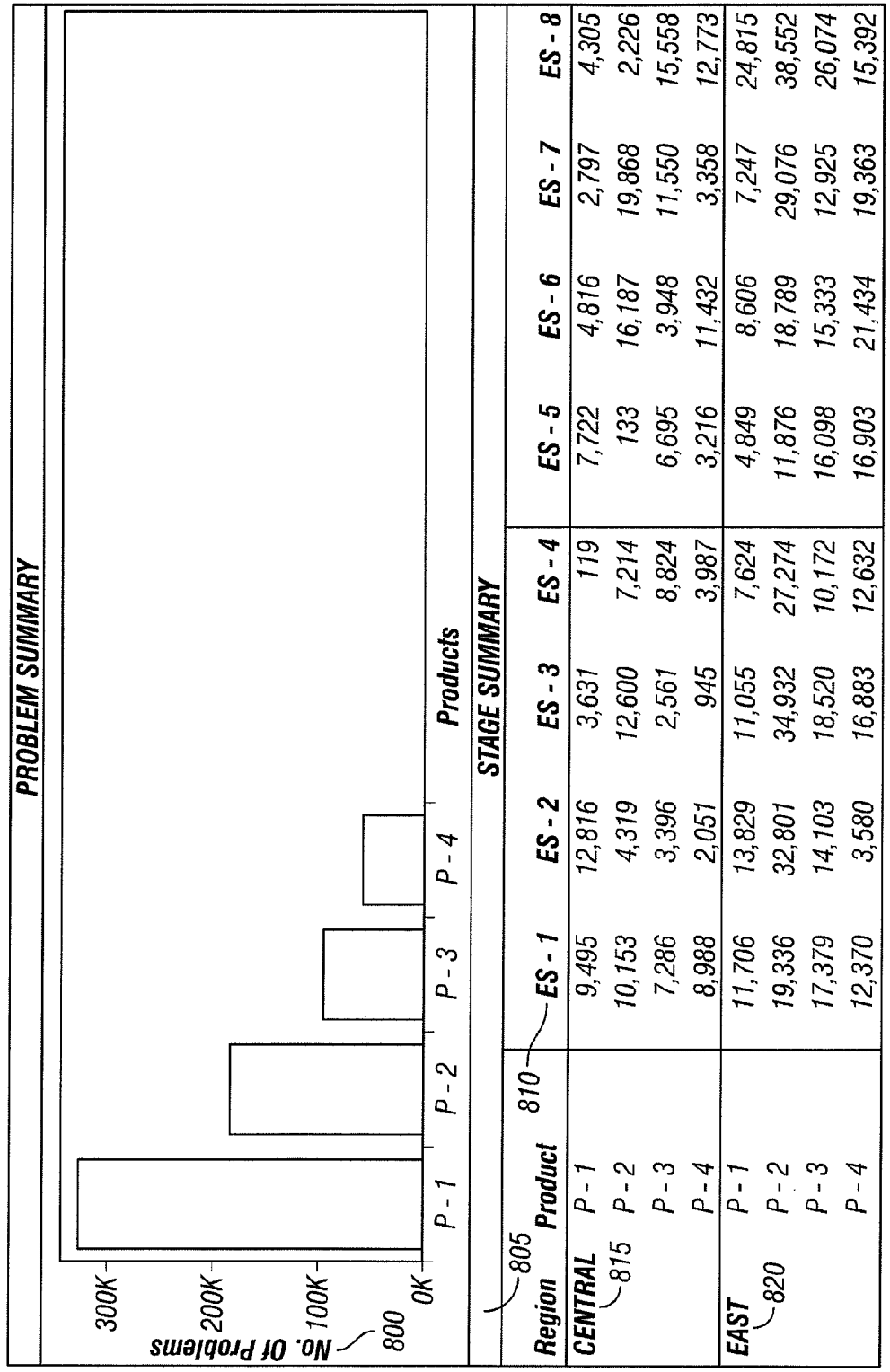
FIG. 8 illustrates a bar graph of the number of problems as a function of the type of product and a report of the number of problems of each product in different locations as a function of the time of purchase according to one embodiment of the invention.

In one embodiment, the model generator 130 generates a model with multiple sections to depict more detailed information. FIG. 8 is an example of a model that depicts the number of problems 800 for four different products 805 as a bar graph and displays the number of people in each of the eight engagement stages 810 for each product for the central 815 and eastern 820 regions of the United States. Thus, the problems faced by a customer are analyzed according to the product, the location of the customer, and the time from purchase.

Figure 9:
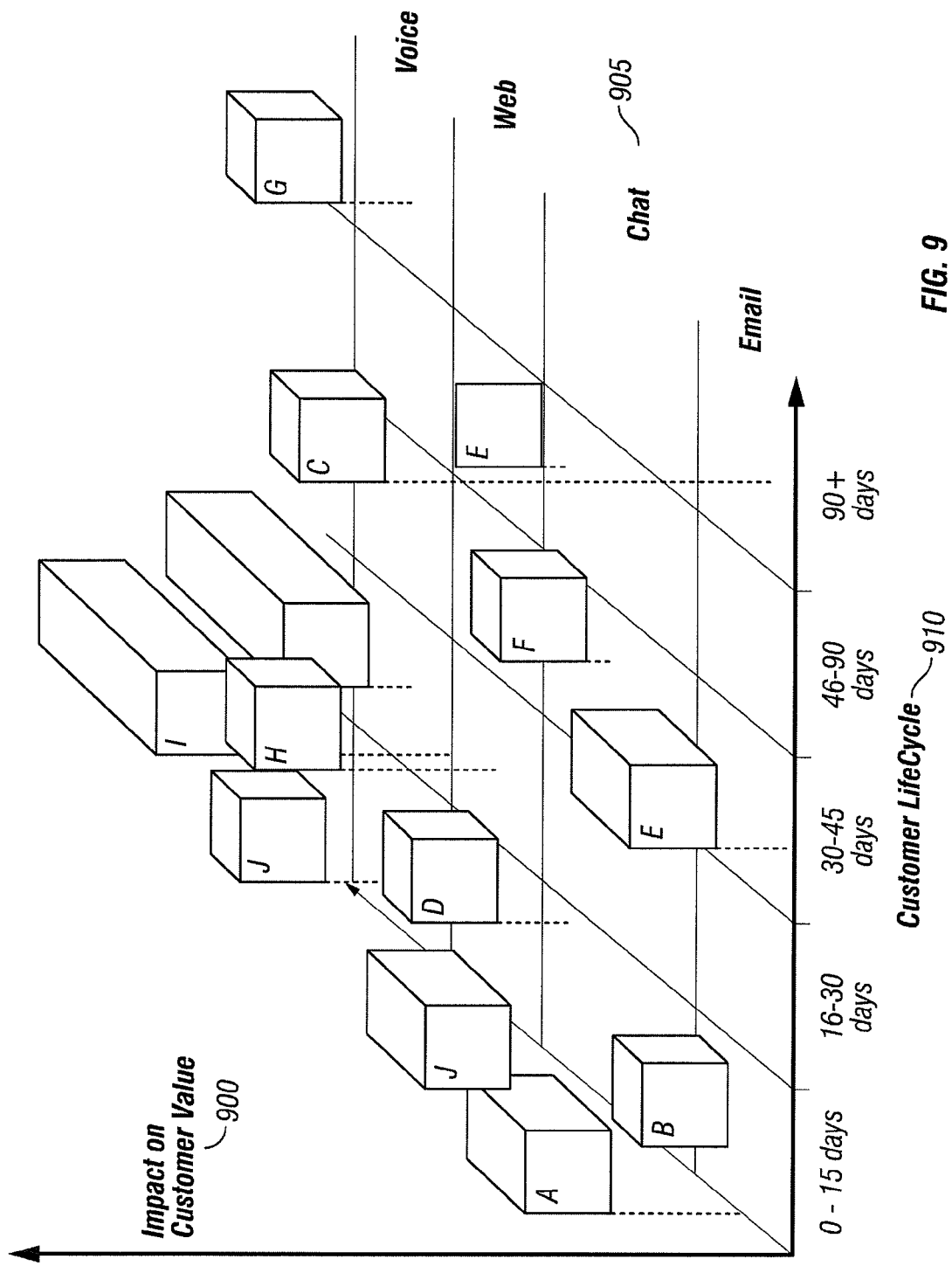
FIG. 9 is a model of the impact on customer value as a function of the customer lifestyle and the type of communication with the customer according to one embodiment of the invention.

FIG. 9 is an example of a three-dimensional model to depicts the impact on customer value 900 as a function of the type of interaction 905 and the customer lifecycle 910, i.e. the date from purchase. From this figure, a user can learn that communicating with customers over the telephone 0-15 days from purchase generates the greatest impact on customer value and is therefore worth the added expense of using a person to communicate with the customer.

Figure 10:
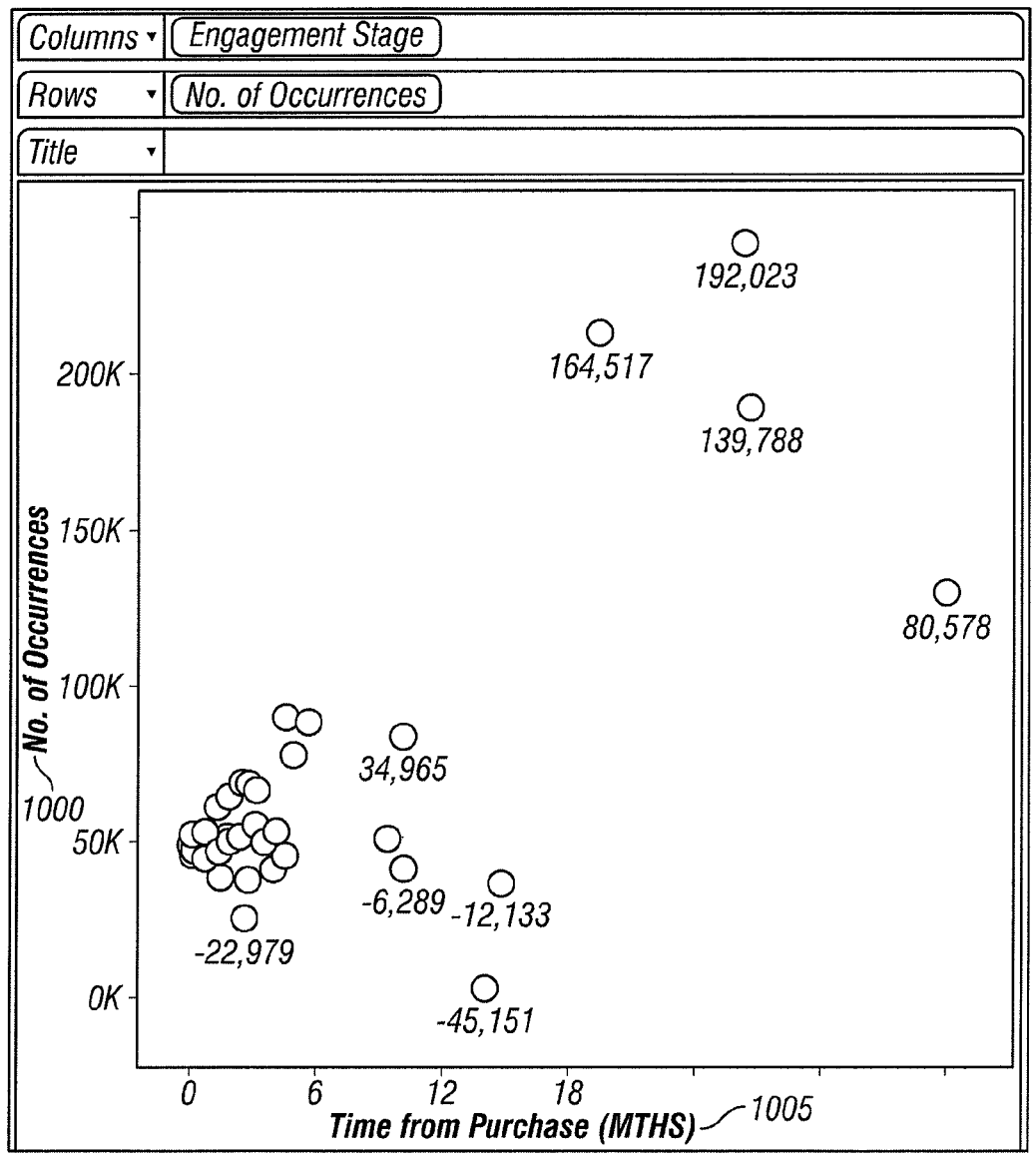
FIG. 10 is a model of the number of occurrences as a function of the time of purchase according to one embodiment of the invention.

Customer problems can also be illustrated in two dimensional graphs. FIG. 10 is an example of the number of customer problems, which is expressed as number of occurrences 1000 as a function of the engagement state, which is expressed in terms of months from the time of purchase 1005.

Figure 11:
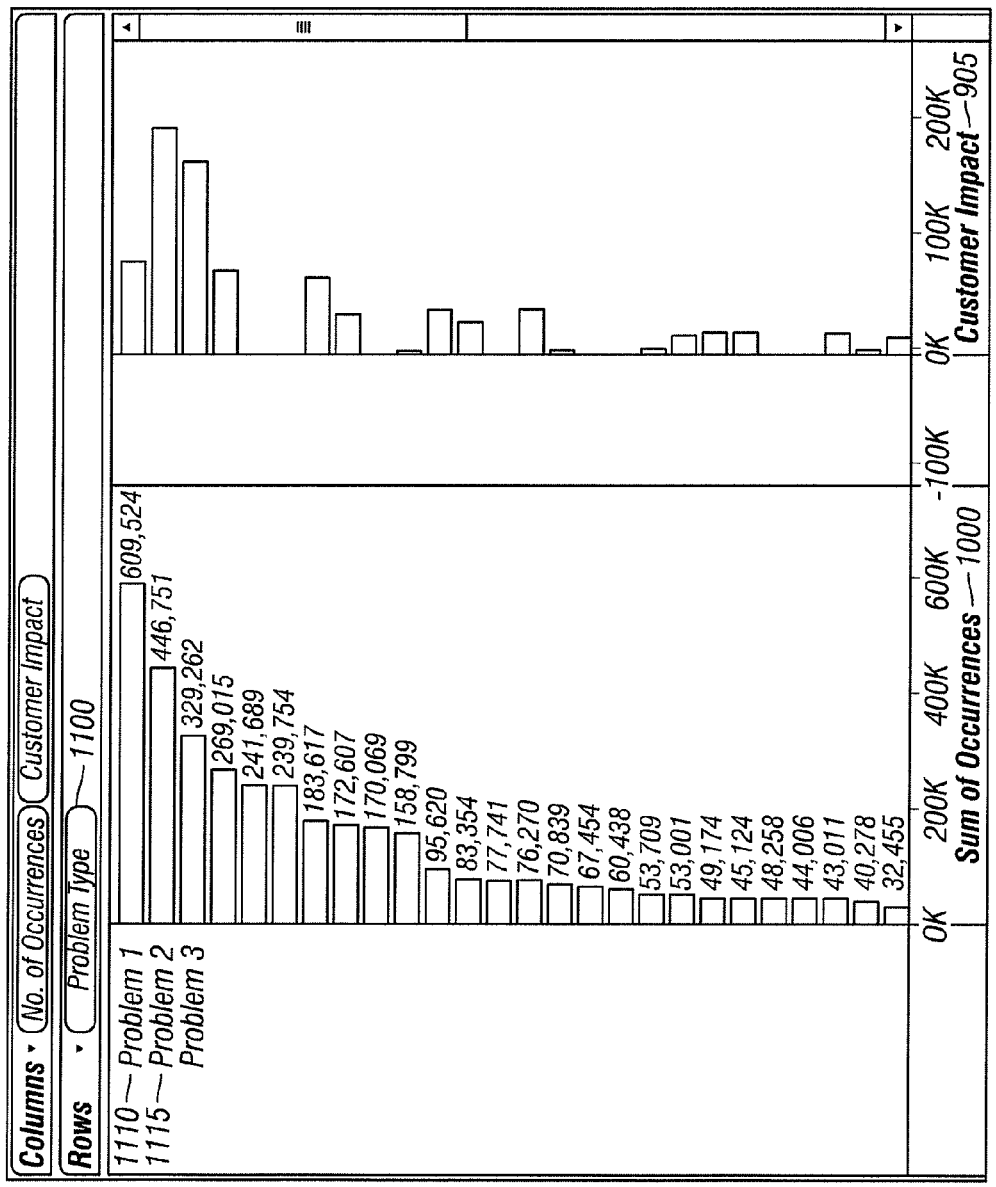
FIG. 11 is a model of the number of occurrences of each type of problem and the resulting customer impact according to one embodiment of the invention.

FIG. 11 shows the number of occurrences 1000 for each type of problem 1100 and the resulting customer impact 1005. From this figure, a user can determine that although there are more instances of Problem 1 (1110) than Problem 2 (1115), because Problem 2 (1115) creates more of an impact, it makes more sense to devote more resources to remedying the second problem.

Figure 12:
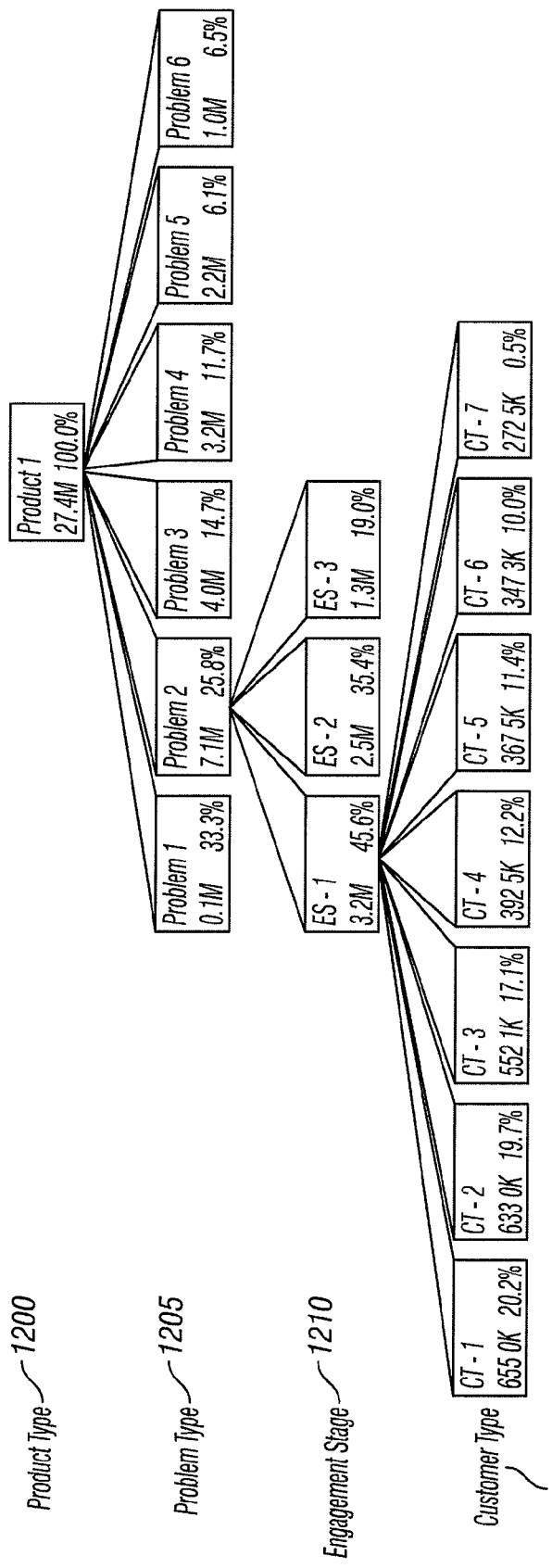
FIG. 12 is a model for predicting the probability of a customer to face a particular problem according to one embodiment of the invention.

The models can also predict future actions. FIG. 12 is an example where a user selects a product type 1200. The model displays the different problems 1205 associated with that product 1200. The user specifies the engagement stage 1210. The model displays the likelihood that a certain type of customer 1215 at that engagement stage 1210 will have a problem. Customer types are organized according to multiple variables. For example, a problem customer is a customer that reports issues associated with products frequently, returns products, takes over ten minutes to speak with an agent during calls, etc.

Figure 13:
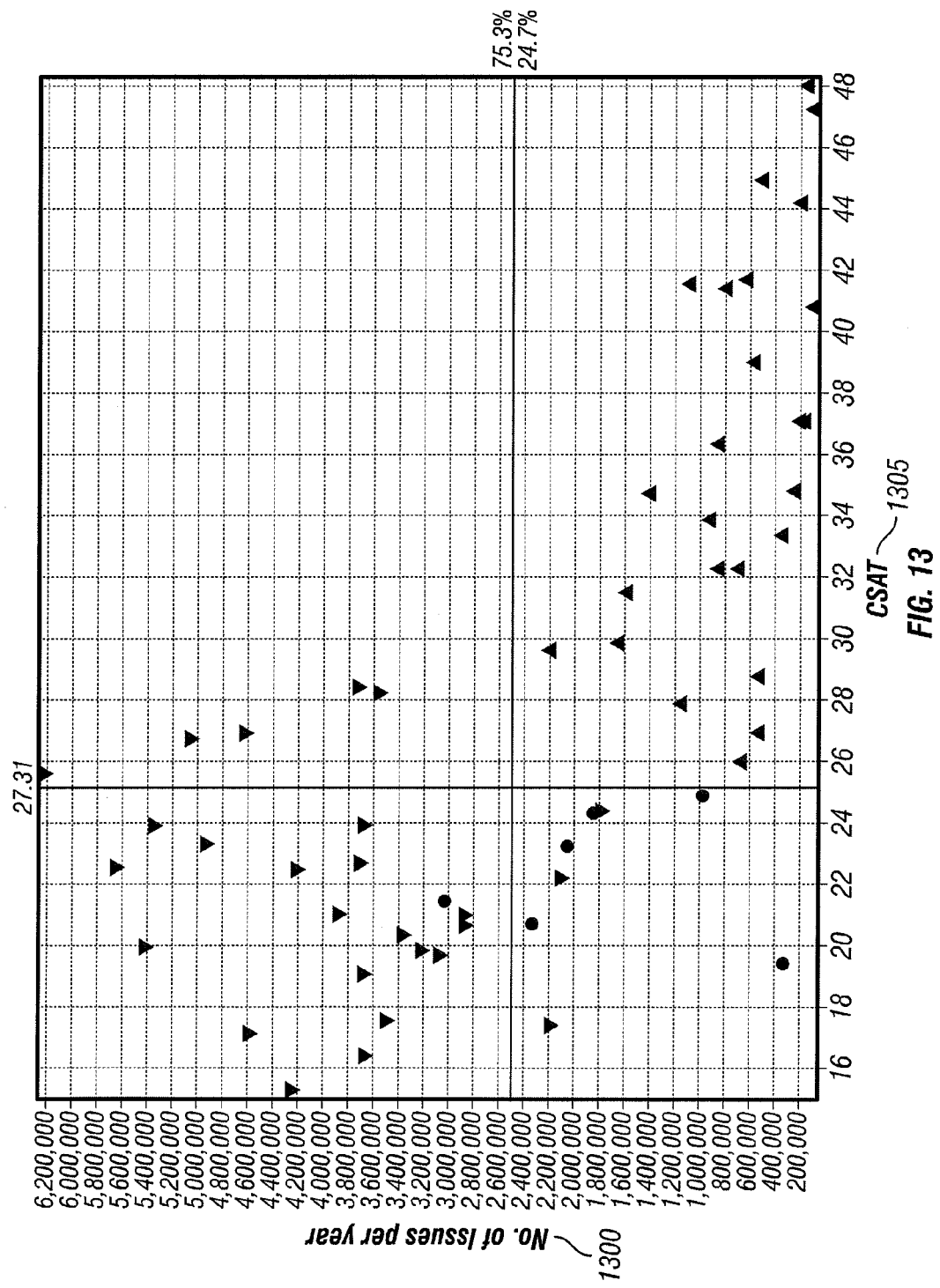
FIG. 13 is a model that illustrates the number of issues per year as a function of a customer satisfaction score according to one embodiment of the invention.

FIG. 13 illustrates the relationship between the number of issues 1300 with regard to two products marked by the circles and triangles on the graph as a function of the customer satisfaction (CSAT) score 1305.

Figure 14:
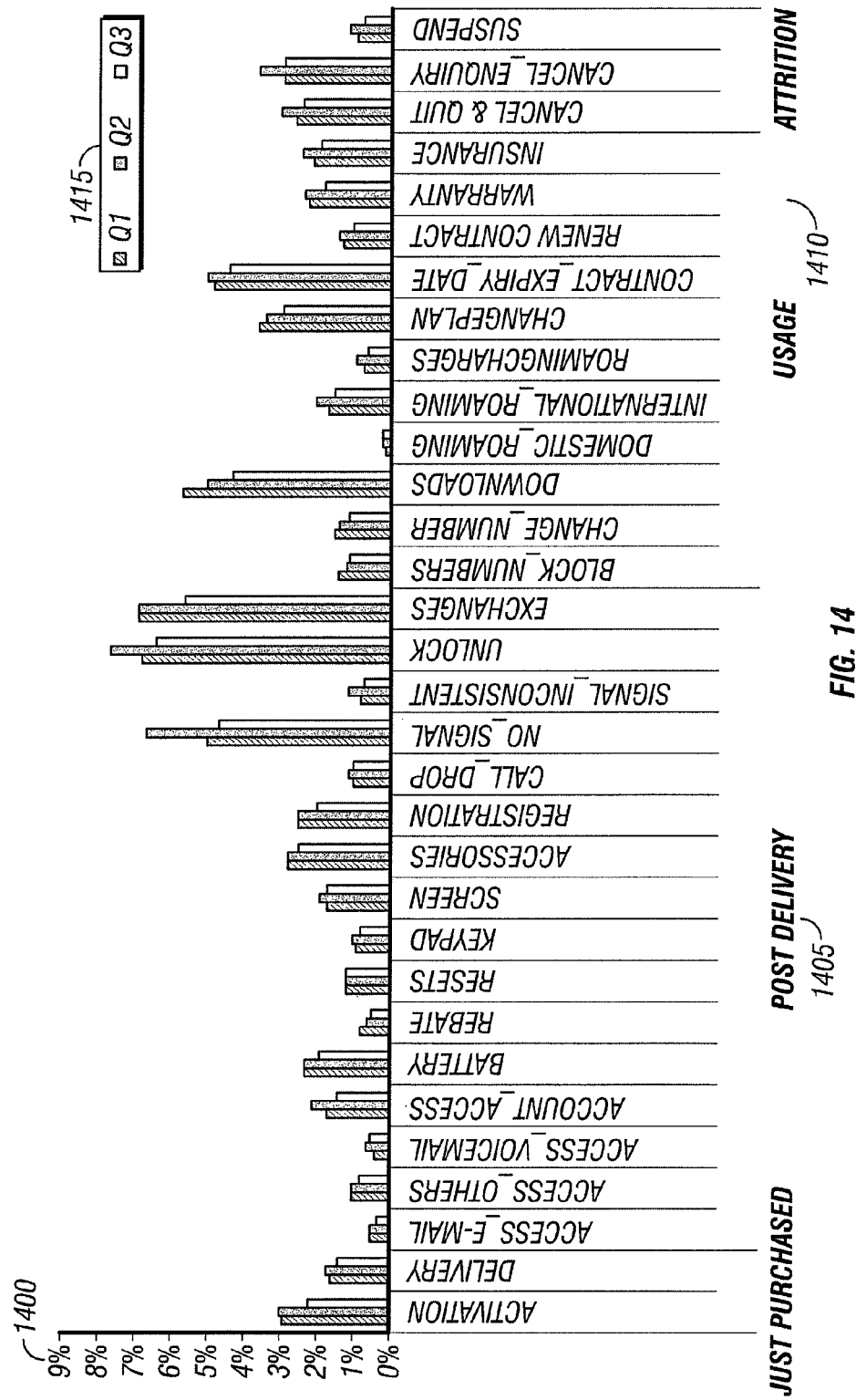
FIG. 14 illustrates the percentage of customer queries organized according to time and the nature of the query according to one embodiment of the invention.
Figure 15:
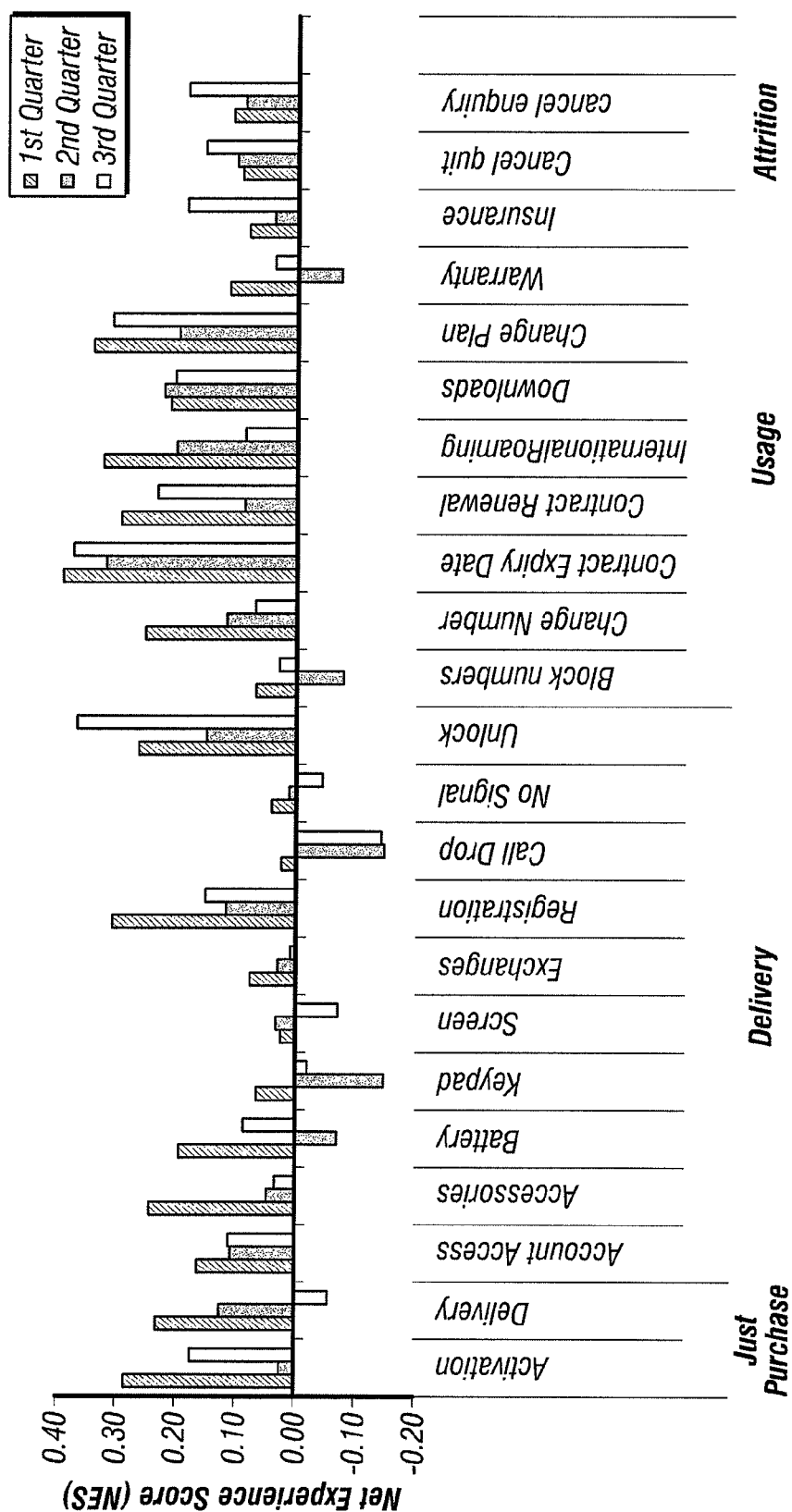
FIG. 15 illustrates the net experience score calculated from customer queries organized according to time and the nature of the query according to one embodiment of the invention.
Figure 16:
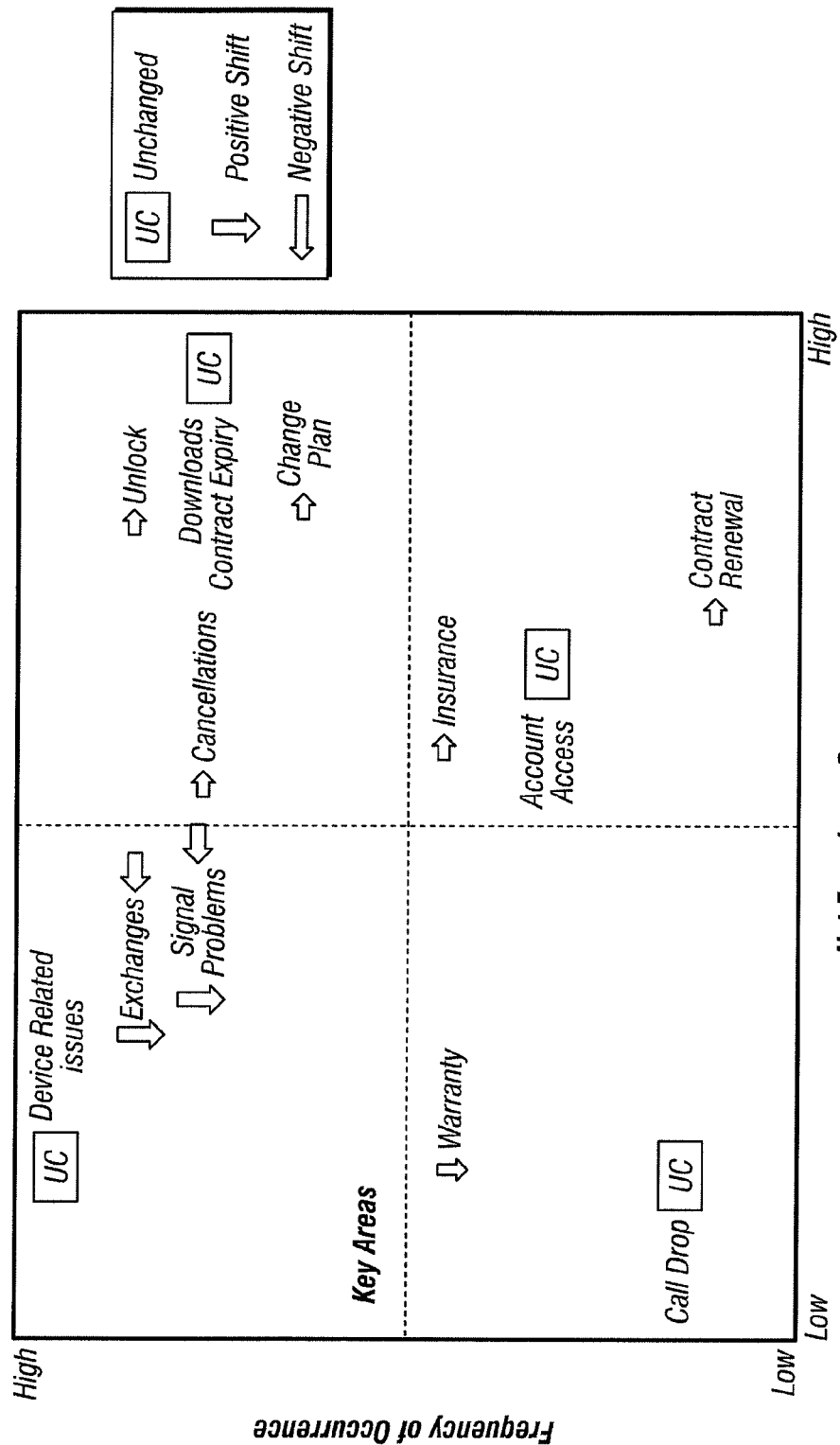
FIG. 16 illustrates the movement of problem areas in the third quarter as a function of the frequency of occurrences and NES according to one embodiment of the invention.

FIGS. 14, 15, and 16 illustrate models for analyzing customer queries about mobile phones where the queries culled from text messaging to agents that identify specific areas of improvement according to one embodiment of the invention. FIG. 14 illustrates the percentage of customer queries 1400 organized according to time 1405 (just purchased, post delivery) and the nature of the query 1410 (usage, attrition). These queries are further divided according to the quarter 1415 of the year during which the customer initiated the query. The data is obtained from text mining of chats between the customer and agent. From this model, the mobile phone seller can conclude that overall, there is a predictable distribution of customer queries. In trying to determine areas for improvement, the seller can not that there was a sudden spike in signal problems during the second quarter. Furthermore, there was a sudden drop in exchanges during the third quarter.

FIG. 15 illustrates the same customer queries as in FIG. 14 as a function of the net experience score (NES) 1500. From this model, the mobile phone seller concludes that there were some systematic problems during the second quarter. By combining the information gleans from FIG. 14 with FIG. 15, the seller concludes that having no signal is not only a problem, but it is one that is not resolved by the customer speaking with an agent. Furthermore, although the contract expiry date was the subject of several calls, the outcome of these calls was very positive.

FIG. 16 illustrates the movement of problem areas in the third quarter as a function of the frequency of occurrences and net experience score. From this model, the mobile device seller can conclude that more resources should be devoted to fixing exchanges and signal problems.

Figure 17:
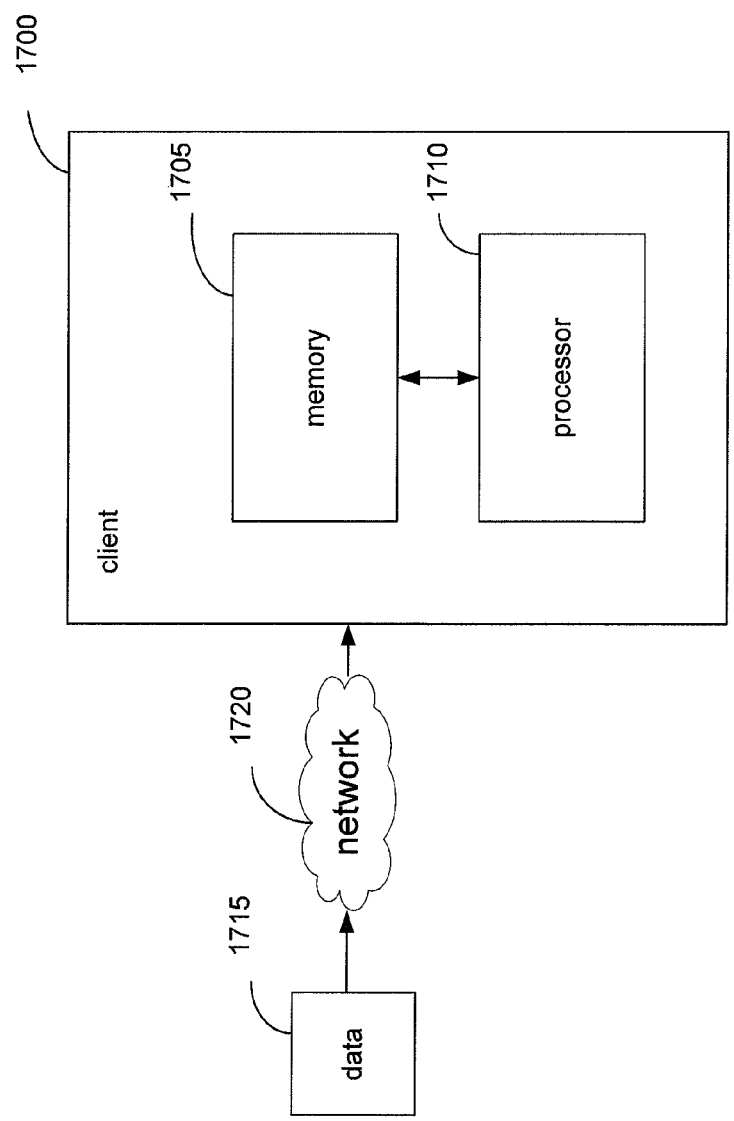
FIG. 17 is a block diagram that illustrates hardware components according to one embodiment of the invention.

The system for predicting customer behavior can be implemented in computer software that is stored in a computer-readable storage medium on a client computer. FIG. 17 is a block diagram that illustrates a client that stores the apparatus for predicting customer behavior according to one embodiment of the invention. The client 1700, e.g. a computer, a laptop, a personal digital assistance, etc. is a computing platform. The client contains computer-readable memory 1705, e.g., random access memory, flash memory, read only memory, electronic, optical, magnetic, etc. that is communicatively coupled to a processor 1710, e.g., CD-ROM, DVD, magnetic disk, etc. The processor 1710 executes computer-executable program code stored in memory 1705.

In one embodiment, the client 1700 receives data 1715 via a network 1720. The network 1720 can comprise any mechanism for the transmission of data, e.g., internet, wide area network, local area network, etc.

Figure 18:
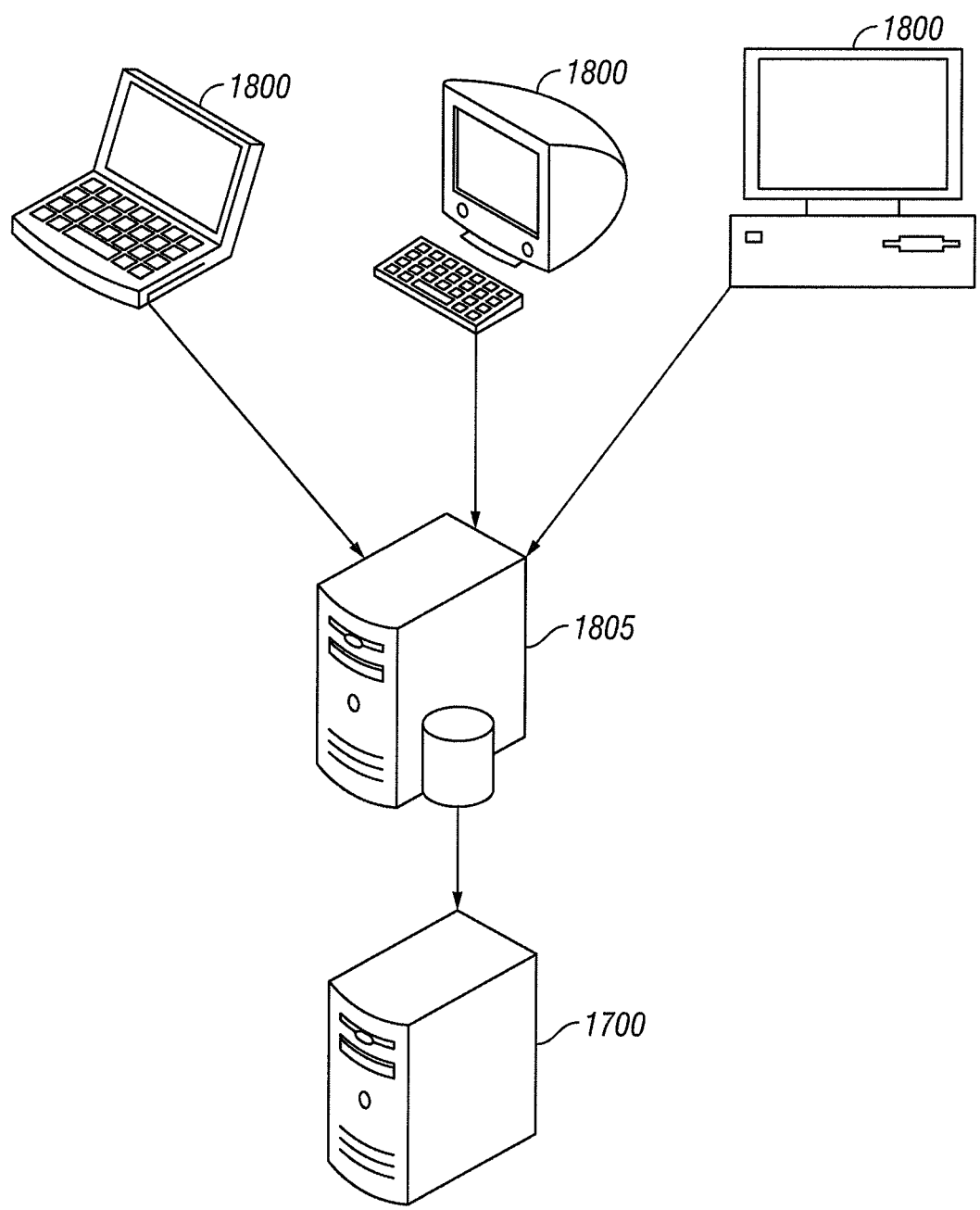
FIG. 18 is a block diagram that illustrates different sources for receiving data according to one embodiment of the invention.

FIG. 18 is a block diagram that illustrates the hardware that provides data and stores data for predicting customer behavior according to one embodiment of the invention. Customer data 1800 is received from a plurality of customers. The data is organized according to a product dimension, a problem dimension, a customer dimension, and an agent dimension. These product dimensions are stored in databases on a computer readable storage medium 1805. The data is transmitted to a client 1700 that comprises the apparatus for predicting customer behavior.

Figure 19:
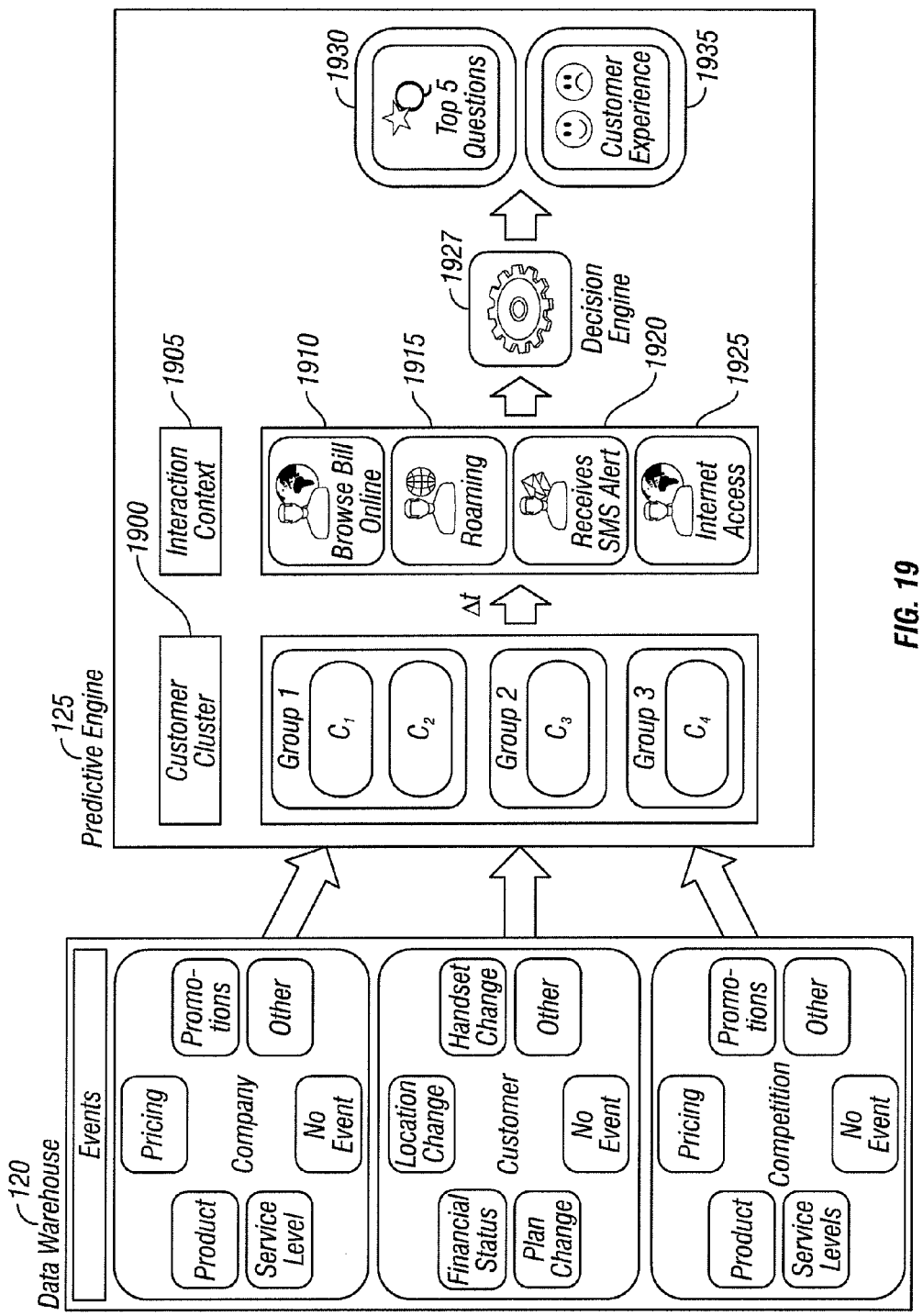
FIG. 19 is a block diagram that illustrates a predictive engine 125 according to one embodiment of the invention.

FIG. 19 is a block diagram that illustrates one embodiment of the predictive engine 125. The predictive engine generates real time decisions for improved customer experience by analyzing data received from the data warehouse 120. The multi-dimensional attributes that define the customer's interaction with the company are used to segment customers into like clusters 1900. Based on the behavior of the customer segment/cluster and the context of the interaction, e.g. browsing bills online 1910, roaming 1915, receiving a short message service (SMS) 1920, Internet access 1925, a decision engine 1927 generates the top 5 queries 1930 for that segment/context combination and the response to those queries, which are subsequently displayed to the customer. The customer experience 1935 during that interaction is also measured.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. An apparatus for generating a prediction of customer behavior and for selecting and assigning an interaction channel to said customer from among a plurality of interaction channels, comprising:
    a memory;
    a customer interaction data engine processor communicatively coupled to said memory and configured for executing in said memory: transforming data received from a plurality of sources into a format acceptable for storage, said data comprising problem dimension data relating to a customer interaction arising from an issue associated with a product or service, product dimension data relating to a product or service purchased by a customer, structured and unstructured customer dimension data about a plurality of customers, and structured and unstructured agent dimension data about a plurality of agents;
    a data warehouse coupled to said customer interaction data engine, said data warehouse configured for storing said transformed data; and
    a predictive engine coupled to said data warehouse and communicatively coupled to said memory, said predictive engine processor configured for executing in said memory:
        receiving said stored data from said data warehouse;
        compiling said data and determining contributing variables, wherein said compiling and determining comprises computing contributing variables according to whether the variable is for a numerical or categorical prediction and wherein contributing variables for a numerical prediction or a categorical prediction are computed using one or more statistical or predictive algorithms comprising any of: linear regression, logistic regression, Naïve Bayes, neural networks, and support vector machines;
        using said contributing variables to generate predictive models;
        identifying predictive trends in customer behavior as a function of particular data from said stored data, said particular data comprising: a product or service purchased by customers, time that has elapsed from a time said product or service was purchased, customer location, a problem associated with said product or service, and customer impact associated with said problem associated with said product or service, wherein customer impact is a function of type of customer interaction and customer lifecycle;
        predicting any of:
            probability of a customer to face a particular problem or issue based on an engagement stage of the customer with the company, wherein the engagement stage is product or service specific and measured by time after purchase or is the stage of a life cycle of the customer;
            a customer's preference of a particular channel based on type of concern and reduction of resolution time through the particular channel; and
            a probable impact of a particular problem on a customer's loyalty, growth, and profitability score; and
        selecting and assigning an interaction channel to said customer from among a plurality of interaction channels based upon said predicting.

2. The apparatus of claim 1, wherein said customer interaction data engine processor receives unstructured data from conversations between an agent and a customer and said predictive engine processor generates variables for predicting customer behavior based on said text.

3. The apparatus of claim 1, wherein said customer interaction data engine processor receives unstructured data from conversations between an agent and a customer and merges said unstructured data into said format acceptable for storage.

4. The apparatus of claim 1, said customer interaction data engine processor configured for extracting keywords from said received data, said received data further comprising interactions between an agent and a customer, said keywords indicative of at least agent cognitive capabilities, agent emotions, and customer emotions, said customer interaction data engine processor configured for calculating a net experience score using said keywords.

5. The apparatus of claim 1, wherein said problem data comprises at least a unique identification number associated with a particular problem, a description of said problem, a category, a sub-category, and customer impact.

6. The apparatus of claim 1, wherein said product data comprises at least a unique identification number associated with each product, a product, a category, a sub-category if applicable, information about launch of said product or service, and notes.

7. The apparatus of claim 1, wherein said customer data comprises at least a unique identification number associated with each customer, a company name, a location, a phone number, a role contact, an account start date, a first shipment date, a last shipment date, a number of products or services purchased by each customer in a last month, a number of products or services purchased in a last year, a statistics code, a credit limit, and a type of industry associated with a customer.

8. The apparatus of claim 1, wherein said agent data comprises at least a unique identification number associated with each agent, each agent's name, each agent's skill sets, each agent's relevant experience, interactions per day, customer satisfaction scores, gender, average handle times, holding time, talk time, call outcome, call satisfaction, and experience in a process.

9. The apparatus of claim 1, further comprising a user interface for allowing a user to generate models.

10. The apparatus of claim 1, further comprising a user interface for receiving information from a customer for said predictive engine processor to use in comparing said customer to a model of said generated predictive models.

11. A computer-implemented method for generating a model for predicting customer behavior and for selecting and assigning an interaction channel to said customer from among a plurality of interaction channels, the method comprising the steps of:
- receiving at a customer interaction data engine problem data comprising data relating to any customer interaction arising from a purchase of a product or service;
- receiving at said customer interaction data engine product data comprising data relating to a product or service purchased by a customer;
- receiving at said customer interaction data engine customer interaction data comprising information about a customer;
- receiving at said customer interaction data engine agent data comprising information about an agent;
- transforming with said customer interaction data engine said problem data, product data, customer interaction data, and agent data into a storage format;
- storing said data on a computer readable storage medium in a data warehouse;
- determining with a predictive engine contributing variables using said data stored in said data warehouse, wherein determining comprises computing contributing variables according to whether the variable is for a numerical or categorical prediction and wherein contributing variables for a numerical prediction or a categorical prediction are computed using one or more statistical or predictive algorithms comprising any of: linear regression, logistic regression, Naïve Bayes, neural networks, and support vector machines;
- building with said predictive engine a plurality of predictive models using said contributing variables, wherein any of said plurality of predictive models is configured to predict any of:
  - probability of a customer to face a particular problem or issue based on an engagement stage of the customer with the company, wherein the engagement stage is product or service specific and measured by time after purchase or is the stage of a life cycle of the customer;
  - a customer's preference of a particular channel based on type of concern and reduction of resolution time through the particular channel; and
  - a probable impact of a particular problem on a customer's loyalty, growth, and profitability score;
- testing and validating said plurality of predictive models;
- receiving a request to generate a predictive model for a particular customer using, among other things, said contributing variables;
- generating said customer predictive model in real time; and
- using said customer predictive model to select and assign an interaction channel to said customer from among a plurality of interaction channels.

12. The method of claim 11, wherein said contributing variables are determined by applying the Naïve Bayes algorithm to said data.

13. The method of claim 11, further comprising identifying with a processor trends in customer behavior as a function of said data stored in said data warehouse, wherein said stored data comprises: a product or service purchased by customers, time that has elapsed from a time said product or service was purchased, customer location, a problem associated with said product or service, and customer impact associated with said problem associated with said product or service; and
generating a model that predicts a mode for interacting with a customer to minimize cost associated with said interaction based on said identified trends in customer behavior.

14. The method of claim 11, further comprising the steps of:
- presenting a customer with a user interface for asking said customer to identify at least one of said customer's name, a product or service purchased by said customer, and a time of purchase;
- comparing said information identified by said customer to said model; and
- predicting a mode of interaction with said customer that minimizes a cost of interacting with said customer, said predicting based in part on said comparing said information to said model.

15. The method of claim 14, further comprising the steps of:
- responsive to identifying said mode of interaction as a phone call with an agent;
- identifying a specific agent based on said agent's experience level; and
- providing said customer with a number of said specific agent.

16. The method of claim 11, further comprising the steps of:
- receiving with said customer data interaction engine text files from conversations between an agent and a customer;
- extracting keywords from said text files that are indicative of agent cognitive capabilities, agent emotions, and customer emotions;
- weighting said keywords; and
- calculating a net experience score of the customer based on said weighted keywords.

17. The method of claim 13 or 14, wherein said mode for interacting with said customer comprises telephone, internet chat, email, and web.

18. The method of claim 13, wherein said trends in customer behavior further comprise a function of an agent, an agent's gender, and an agent's experience.

19. The method of claim 11, wherein said predictive engine is configured to generate a model comprising at least one of a text table, aligned bars, stacked bars, discrete lines, scatter plots, Gantt charts, heat maps, side-by-side bars, measure bars, circles, scatter matrices, and histograms.

20. An apparatus for generating a prediction of customer behavior and for selecting and assigning an interaction channel to said customer from among a plurality of interactions channels, comprising:

a customer interaction data engine processor configured for transforming data received from a plurality of sources into a format acceptable for storage, said data comprising problem data relating to a customer interaction arising from a purchase of a product or service, product data relating to a product or service purchased by a customer, customer data about a plurality of customers, and agent data about a plurality of agents;

a data warehouse coupled to said customer interaction data engine, said data warehouse configured for storing said transformed data;

a predictive engine processor coupled to said data warehouse, said predictive engine configured for:

receiving said stored data from said data warehouse, compiling said data and determining contributing variables, wherein said compiling and determining comprises computing contributing variables according to whether the variable is for a numerical or categorical prediction and wherein contributing variables for a numerical prediction or a categorical prediction are computed using one or more statistical or predictive algorithms comprising any of: linear regression, logistic regression, Naïve Bayes, neural networks, and support vector machines, using said contributing variables to generate predictive models, receiving a request for a predictive model, generating said requested predictive model in real time in response to said request wherein said requested predictive model predicts any of:

probability of a customer to face a particular problem or issue based on an engagement stage of the customer with the company, wherein the engagement stage is product or service specific and measured by time after purchase or is the stage of a life cycle of the customer;

a customer's preference of a particular channel based on type of concern and reduction of resolution time through the particular channel;

a probable impact of a particular problem on a customer's loyalty, growth, and profitability score, and using said predictive model to select and assign an interaction channel to said customer from among a plurality of interaction channels based upon said predicting.

* * * * *